US009609379B2

(12) United States Patent
Martch et al.

(10) Patent No.: US 9,609,379 B2
(45) Date of Patent: *Mar. 28, 2017

(54) MOSAIC FOCUS CONTROL

(71) Applicant: Echostar Technologies L.L.C., Englewood, CO (US)

(72) Inventors: Henry Gregg Martch, Parker, CO (US); Max Stephen Gratton, Lakewood, CO (US)

(73) Assignee: ECHOSTAR TECHNOLOGIES L.L.C., Englewood, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/195,527

(22) Filed: Jun. 28, 2016

(65) Prior Publication Data
US 2016/0309212 A1 Oct. 20, 2016

Related U.S. Application Data

(63) Continuation of application No. 14/139,420, filed on Dec. 23, 2013, now Pat. No. 9,420,333.

(51) Int. Cl.
*H04N 21/426* (2011.01)
*H04N 21/431* (2011.01)
(Continued)

(52) U.S. Cl.
CPC ..... *H04N 21/42607* (2013.01); *H04N 21/435* (2013.01); *H04N 21/439* (2013.01);
(Continued)

(58) Field of Classification Search
CPC combination set(s) only.
See application file for complete search history.

(56) References Cited

U.S. PATENT DOCUMENTS 6,005,562 A 12/1999 Shiga et al.
6,177,931 B1 1/2001 Alexander et al.
(Continued)

FOREIGN PATENT DOCUMENTS

EP 1 865 716 A2 12/2007
EP 2 309 733 B1 4/2011
(Continued)

OTHER PUBLICATIONS

Extended European Search Report for EP 14160140.1 received Jul. 7, 2014, 7 pages.
(Continued)

*Primary Examiner* — Mulugeta Mengesha
(74) *Attorney, Agent, or Firm* — Kilpatrick Townsend & Stockton LLP

(57) ABSTRACT

A television receiver may be configured to receive, from a user of the television receiver, a set of viewing rules that define a focus preference of the user. The television receiver may output, to a presentation device, a video mosaic comprising a plurality of pieces of content presented as a plurality of tiles. Each piece of content may be linked with a corresponding audio stream from a plurality of audio streams. The television receiver may select a piece of content for focus from the plurality of pieces of content based on the set of viewing rules defined by the user. The television receiver may output only an audio stream linked with the piece of content being focused on from among the plurality of audio streams.

20 Claims, 9 Drawing Sheets

(51) Int. Cl.

| | | |
|---|---|---|
| *H04N 21/45* | (2011.01) | |
| *H04N 21/454* | (2011.01) | |
| *H04N 21/81* | (2011.01) | |
| *H04N 21/435* | (2011.01) | |
| *H04N 21/439* | (2011.01) | |
| *H04N 21/44* | (2011.01) | |
| *H04N 21/458* | (2011.01) | |
| *H04N 21/434* | (2011.01) | |

(52) U.S. Cl.
CPC ..... *H04N 21/4316* (2013.01); *H04N 21/4349* (2013.01); *H04N 21/4394* (2013.01); *H04N 21/44008* (2013.01); *H04N 21/454* (2013.01); *H04N 21/458* (2013.01); *H04N 21/4532* (2013.01); *H04N 21/812* (2013.01)

(56) References Cited

U.S. PATENT DOCUMENTS

| | | |
|---|---|---|
| 6,681,396 B1 | 1/2004 | Bates et al. |
| 7,174,512 B2 | 2/2007 | Martin et al. |
| 7,197,715 B1 * | 3/2007 | Valeria ............... H04N 5/4401 348/E5.099 |
| 7,633,887 B2 | 12/2009 | Panwar et al. |
| 7,680,894 B2 | 3/2010 | Diot et al. |
| 7,774,811 B2 | 8/2010 | Poslinski et al. |
| 7,818,368 B2 | 10/2010 | Yang et al. |
| 7,825,989 B1 | 11/2010 | Greenberg |
| 7,849,487 B1 | 12/2010 | Vosseller |
| 8,024,753 B1 | 9/2011 | Kummer et al. |
| 8,046,798 B1 | 10/2011 | Schlack et al. |
| 8,079,052 B2 | 12/2011 | Chen et al. |
| 8,104,065 B2 | 1/2012 | Aaby et al. |
| 8,209,713 B1 | 6/2012 | Lai et al. |
| 8,296,797 B2 | 10/2012 | Olstad et al. |
| 8,312,486 B1 | 11/2012 | Briggs et al. |
| 8,424,041 B2 | 4/2013 | Candelore et al. |
| 8,427,356 B1 | 4/2013 | Satish |
| 8,689,258 B2 | 4/2014 | Kemp |
| 8,752,084 B1 | 6/2014 | Lai et al. |
| 8,973,038 B2 | 3/2015 | Gratton |
| 8,973,068 B2 | 3/2015 | Kotecha et al. |
| 8,990,418 B1 | 3/2015 | Bragg et al. |
| 9,038,127 B2 | 5/2015 | Hastings et al. |
| 9,066,156 B2 | 6/2015 | Kapa |
| 9,213,986 B1 | 12/2015 | Buchheit et al. |
| 9,253,533 B1 | 2/2016 | Morgan et al. |
| 9,420,333 B2 | 8/2016 | Martch et al. |
| 2001/0013123 A1 | 8/2001 | Freeman et al. |
| 2001/0026609 A1 | 10/2001 | Weinstein et al. |
| 2002/0059610 A1 | 5/2002 | Ellis |
| 2002/0067376 A1 | 6/2002 | Martin et al. |
| 2002/0075402 A1 | 6/2002 | Robson et al. |
| 2002/0174430 A1 | 11/2002 | Ellis et al. |
| 2002/0178444 A1 | 11/2002 | Trajkovic et al. |
| 2003/0023742 A1 | 1/2003 | Allen et al. |
| 2003/0056220 A1 | 3/2003 | Thornton et al. |
| 2003/0066077 A1 | 4/2003 | Gutta et al. |
| 2003/0118014 A1 | 6/2003 | Iyer et al. |
| 2003/0126605 A1 | 7/2003 | Betz et al. |
| 2003/0126606 A1 | 7/2003 | Buczak et al. |
| 2003/0188317 A1 | 10/2003 | Liew et al. |
| 2003/0189674 A1 | 10/2003 | Inoue et al. |
| 2003/0208763 A1 | 11/2003 | McElhatten et al. |
| 2003/0229899 A1 | 12/2003 | Thompson et al. |
| 2004/0181807 A1 | 9/2004 | Theiste et al. |
| 2005/0030977 A1 | 2/2005 | Casey et al. |
| 2005/0044570 A1 | 2/2005 | Poslinski |
| 2005/0071865 A1 | 3/2005 | Martins |
| 2005/0125302 A1 | 6/2005 | Brown et al. |
| 2005/0152565 A1 | 7/2005 | Jouppi et al. |
| 2005/0166230 A1 | 7/2005 | Gaydou et al. |
| 2005/0180568 A1 | 8/2005 | Krause |
| 2005/0191041 A1 | 9/2005 | Braun et al. |
| 2005/0240961 A1 | 10/2005 | Jerding et al. |
| 2005/0264705 A1 | 12/2005 | Kitamura |
| 2006/0020962 A1 | 1/2006 | Stark et al. |
| 2006/0085828 A1 | 4/2006 | Dureau et al. |
| 2006/0174277 A1 | 8/2006 | Sezan et al. |
| 2006/0190615 A1 | 8/2006 | Panwar et al. |
| 2006/0238656 A1 | 10/2006 | Chen et al. |
| 2006/0253581 A1 | 11/2006 | Dixon et al. |
| 2006/0282852 A1 * | 12/2006 | Purpura ............ H04N 5/44543 725/39 |
| 2006/0282869 A1 | 12/2006 | Plourde, Jr. |
| 2007/0033616 A1 | 2/2007 | Gutta |
| 2007/0058930 A1 | 3/2007 | Iwamoto |
| 2007/0083901 A1 | 4/2007 | Bond |
| 2007/0127894 A1 | 6/2007 | Ando et al. |
| 2007/0146554 A1 | 6/2007 | Strickland et al. |
| 2007/0154163 A1 | 7/2007 | Cordray |
| 2007/0154169 A1 | 7/2007 | Cordray et al. |
| 2007/0157235 A1 | 7/2007 | Teunissen |
| 2007/0157249 A1 | 7/2007 | Cordray et al. |
| 2007/0157253 A1 | 7/2007 | Ellis et al. |
| 2007/0188655 A1 | 8/2007 | Ohta |
| 2007/0199040 A1 | 8/2007 | Kates |
| 2007/0204302 A1 * | 8/2007 | Calzone ............ H04N 21/4755 725/46 |
| 2007/0226766 A1 | 9/2007 | Poslinski et al. |
| 2007/0245379 A1 | 10/2007 | Agnihortri |
| 2008/0022012 A1 | 1/2008 | Wang |
| 2008/0060006 A1 * | 3/2008 | Shanks ............ H04N 5/44543 725/38 |
| 2008/0086743 A1 | 4/2008 | Cheng et al. |
| 2008/0097949 A1 | 4/2008 | Kelly et al. |
| 2008/0109307 A1 | 5/2008 | Ullah |
| 2008/0134043 A1 | 6/2008 | Georgis et al. |
| 2008/0163305 A1 | 7/2008 | Johnson et al. |
| 2008/0195457 A1 | 8/2008 | Sherman et al. |
| 2008/0235348 A1 | 9/2008 | Dasgupta |
| 2008/0239169 A1 | 10/2008 | Moon et al. |
| 2008/0300982 A1 | 12/2008 | Larson et al. |
| 2008/0320523 A1 | 12/2008 | Morris et al. |
| 2009/0044217 A1 | 2/2009 | Lutterbach et al. |
| 2009/0055385 A1 | 2/2009 | Jeon et al. |
| 2009/0102984 A1 | 4/2009 | Arling et al. |
| 2009/0138902 A1 | 5/2009 | Kamen |
| 2009/0178071 A1 | 7/2009 | Whitehead |
| 2009/0234828 A1 | 9/2009 | Tu |
| 2009/0249412 A1 | 10/2009 | Bhogal et al. |
| 2009/0293093 A1 | 11/2009 | Igarashi |
| 2009/0299824 A1 | 12/2009 | Barnes, Jr. |
| 2009/0325523 A1 | 12/2009 | Choi |
| 2010/0040151 A1 | 2/2010 | Garrett |
| 2010/0071007 A1 | 3/2010 | Meijer |
| 2010/0071062 A1 | 3/2010 | Choyi et al. |
| 2010/0089996 A1 | 4/2010 | Koplar |
| 2010/0115554 A1 * | 5/2010 | Drouet ............ H04N 5/44543 725/41 |
| 2010/0122294 A1 | 5/2010 | Craner |
| 2010/0146560 A1 | 6/2010 | Bonfrer |
| 2010/0153983 A1 | 6/2010 | Phillmon et al. |
| 2010/0153999 A1 * | 6/2010 | Yates ............ H04N 5/44543 725/39 |
| 2010/0158479 A1 | 6/2010 | Craner |
| 2010/0166389 A1 | 7/2010 | Knee et al. |
| 2010/0169925 A1 | 7/2010 | Takegoshi |
| 2010/0218214 A1 | 8/2010 | Fan et al. |
| 2010/0251295 A1 | 9/2010 | Amento et al. |
| 2010/0262986 A1 | 10/2010 | Adimatyam et al. |
| 2010/0269144 A1 | 10/2010 | Forsman et al. |
| 2010/0319019 A1 | 12/2010 | Zazza |
| 2010/0322592 A1 | 12/2010 | Casagrande |
| 2010/0333131 A1 | 12/2010 | Parker et al. |
| 2011/0016492 A1 | 1/2011 | Morita |
| 2011/0019839 A1 | 1/2011 | Nandury |
| 2011/0052156 A1 | 3/2011 | Kuhn |
| 2011/0072448 A1 | 3/2011 | Stiers et al. |
| 2011/0109801 A1 | 5/2011 | Thomas et al. |
| 2011/0202956 A1 | 8/2011 | Connelly et al. |
| 2011/0206342 A1 | 8/2011 | Thompson et al. |
| 2011/0239249 A1 | 9/2011 | Murison et al. |

(56) References Cited

U.S. PATENT DOCUMENTS

| | | |
|---|---|---|
| 2011/0243533 A1 | 10/2011 | Stern et al. |
| 2011/0252451 A1 | 10/2011 | Turgeman et al. |
| 2011/0286721 A1 | 11/2011 | Craner |
| 2011/0289410 A1 | 11/2011 | Paczkowski et al. |
| 2011/0293113 A1 | 12/2011 | McCarthy |
| 2012/0020641 A1 | 1/2012 | Sakaniwa et al. |
| 2012/0052941 A1 | 3/2012 | Mo |
| 2012/0060178 A1 | 3/2012 | Minakuchi et al. |
| 2012/0106932 A1 | 5/2012 | Grevers, Jr. |
| 2012/0131613 A1 | 5/2012 | Ellis et al. |
| 2012/0185895 A1 | 7/2012 | Wong et al. |
| 2012/0204209 A1 | 8/2012 | Kubo |
| 2012/0230651 A1 | 9/2012 | Chen |
| 2012/0246672 A1 | 9/2012 | Sridhar et al. |
| 2012/0278837 A1 | 11/2012 | Curtis et al. |
| 2012/0311633 A1 | 12/2012 | Mandrekar et al. |
| 2013/0014159 A1 | 1/2013 | Wiser et al. |
| 2013/0055304 A1 | 2/2013 | Kirby et al. |
| 2013/0061313 A1 | 3/2013 | Cullimore et al. |
| 2013/0074109 A1 | 3/2013 | Skelton et al. |
| 2013/0114940 A1 | 5/2013 | Merzon et al. |
| 2013/0128119 A1 | 5/2013 | Madathodiyil et al. |
| 2013/0145023 A1 | 6/2013 | Li et al. |
| 2013/0174196 A1 | 7/2013 | Herlein |
| 2013/0194503 A1 | 8/2013 | Yamashita |
| 2013/0263189 A1 | 10/2013 | Garner |
| 2013/0283162 A1 | 10/2013 | Aronsson et al. |
| 2013/0298151 A1 | 11/2013 | Leske et al. |
| 2013/0332962 A1 | 12/2013 | Moritz et al. |
| 2013/0346302 A1 | 12/2013 | Purves et al. |
| 2014/0032709 A1 | 1/2014 | Saussy et al. |
| 2014/0068675 A1 | 3/2014 | Mountain |
| 2014/0123160 A1 | 5/2014 | van Coppenolle et al. |
| 2014/0139555 A1 | 5/2014 | Levy |
| 2014/0140680 A1 | 5/2014 | Jo |
| 2014/0153904 A1 | 6/2014 | Adimatyam et al. |
| 2014/0157327 A1 | 6/2014 | Roberts et al. |
| 2014/0215539 A1 | 7/2014 | Chen et al. |
| 2014/0282714 A1 | 9/2014 | Hussain |
| 2014/0282741 A1 | 9/2014 | Shoykhet |
| 2014/0282745 A1 | 9/2014 | Chipman et al. |
| 2014/0282759 A1 | 9/2014 | Harvey et al. |
| 2014/0294201 A1 | 10/2014 | Johnson et al. |
| 2014/0310819 A1 | 10/2014 | Cakarel et al. |
| 2014/0313341 A1 | 10/2014 | Stribling |
| 2014/0325556 A1 | 10/2014 | Hoang et al. |
| 2014/0331260 A1 | 11/2014 | Gratton |
| 2014/0333841 A1 | 11/2014 | Steck |
| 2014/0351045 A1 | 11/2014 | Abihssira et al. |
| 2014/0373079 A1 | 12/2014 | Friedrich et al. |
| 2015/0003814 A1 | 1/2015 | Miller |
| 2015/0020097 A1 | 1/2015 | Freed et al. |
| 2015/0040176 A1 | 2/2015 | Hybertson et al. |
| 2015/0058890 A1 | 2/2015 | Kapa |
| 2015/0095932 A1 | 4/2015 | Ren |
| 2015/0118992 A1 | 4/2015 | Wyatt et al. |
| 2015/0181132 A1 | 6/2015 | Kummer et al. |
| 2015/0181279 A1 | 6/2015 | Martch et al. |
| 2015/0249803 A1 | 9/2015 | Tozer et al. |
| 2015/0249864 A1 | 9/2015 | Tang et al. |
| 2015/0310725 A1 | 10/2015 | Koskan et al. |
| 2015/0334461 A1 | 11/2015 | Yu |
| 2016/0066020 A1 | 3/2016 | Mountain |
| 2016/0066026 A1 | 3/2016 | Mountain |
| 2016/0066049 A1 | 3/2016 | Mountain |
| 2016/0066056 A1 | 3/2016 | Mountain |
| 2016/0073172 A1 | 3/2016 | Sharples |
| 2016/0088351 A1 | 3/2016 | Petruzzelli et al. |
| 2016/0191147 A1 | 6/2016 | Martch |
| 2016/0198229 A1 | 7/2016 | Keipert |

FOREIGN PATENT DOCUMENTS

| | | | |
|---|---|---|---|
| EP | 2 403 239 | A1 | 1/2012 |
| FR | 2 902 568 | A1 | 12/2007 |
| JP | H10 322622 | A | 12/1998 |
| JP | 2006-245745 | A | 9/2006 |
| KR | 2004 0025073 | A | 3/2004 |
| KR | 2006 0128295 | A | 12/2006 |
| WO | 98/37694 | A1 | 8/1998 |
| WO | 2005/059807 | A2 | 6/2005 |
| WO | 2007/064987 | A2 | 7/2007 |
| WO | 2007/098067 | A1 | 8/2007 |
| WO | 2009/073925 | A1 | 6/2009 |
| WO | 2013/016626 | A1 | 1/2013 |
| WO | 2014/072742 | A1 | 5/2014 |
| WO | 2014/179017 | A1 | 11/2014 |
| WO | 2016/030384 | | 3/2016 |
| WO | 2016/030477 | A1 | 3/2016 |
| WO | 2016/034899 | A1 | 3/2016 |
| WO | 2016/055761 | A1 | 4/2016 |

OTHER PUBLICATIONS

Office Action for EP 14160140.1 mailed Jan. 19, 2016, 5 pages.
European Search Report for EP 14197940.1 mailed Apr. 28, 2015, 13 pages.
International Search Report and Written Opinion for PCT/EP2015/069461 mailed Oct. 1, 2015, 13 pages.
International Search Report and Written Opinion for PCT/EP2015/069456 mailed Oct. 5, 2015, all pages.
International Search Report and Written Opinion of PCT/US2014/033796 mailed Sep. 5, 2014, 12 pages.
International Preliminary Report on Patentability for PCT/US2014/033796 issued Nov. 3, 2015, all pages.
International Search Report and Written Opinion for PCT/EP2015/069681 mailed Nov. 23, 2015, 12 pages.
International Search Report and Written Opinion for PCT/GB2015/052570 mailed Dec. 11, 2015, 13 pages.
International Search Report and Written Opinion for PCT/GB2015/052456 mailed Jun. 13, 2016, all pages.
U.S. Appl. No. 14/200,864, filed Mar. 7, 2014, Non-Final Office Action mailed Dec. 5, 2014, 35 pages.
U.S. Appl. No. 14/200,864, filed Mar. 7, 2014 Final Office Action mailed Jun. 18, 2015, 36 pages.
U.S. Appl. No. 14/200,864, filed Mar. 7, 2014 Non-Final Office Action mailed Feb. 18, 2016, 61 pages.
U.S. Appl. No. 14/200,864, filed Mar. 7, 2014 Notice of Allowance mailed Sep. 15, 2016, all pages.
U.S. Appl. No. 13/886,873, filed May 3, 2013, Notice of Allowance mailed Oct. 24, 2014, 40 pages.
U.S. Appl. No. 14/470,248, filed Aug. 27, 2014, Preinterview first office action mailed Sep. 4, 2015, 22 pages.
U.S. Appl. No. 14/470,248, filed Aug. 27, 2014, Final Office Action mailed Feb. 16, 2016, 26 pages.
U.S. Appl. No. 14/470,248, filed Aug. 27, 2014, Non Final Office Action mailed Jul. 25, 2016, all pages.
U.S. Appl. No. 14/470,279, filed Aug. 27, 2014, Preinterview first office action mailed Aug. 26, 2015, 23 pages.
U.S. Appl. No. 14/470,279, filed Aug. 27, 2014, Final Office Action mailed Jan. 22, 2016, 25 pages.
U.S. Appl. No. 14/470,279, filed Aug. 27, 2014, Non Final Office Action mailed Jul. 19, 2016, all pages.
U.S. Appl. No. 14/479,007, filed Sep. 5, 2014, Non-Final Office Action mailed Sep. 1, 2015, 44 pages.
U.S. Appl. No. 14/479,007, filed Sep. 5, 2014, Final Office Action mailed Feb. 22, 2016, 37 pages.
U.S. Appl. No. 14/479,007, filed Sep. 5, 2014, Non-Final Office Action mailed Jul. 27, 2016, 37 pages.
U.S. Appl. No. 14/591,474, filed Jan. 7, 2015, Non-Final Office Action mailed Feb. 12, 2016, 32 pages.
U.S. Appl. No. 14/494,079, filed Sep. 23, 2014, Preinterview first office action mailed Feb. 10, 2016, 6 pages.
U.S. Appl. No. 14/095,860, filed Dec. 3, 2013 Non-Final Office Action mailed Dec. 26, 2014, 45 pages.
U.S. Appl. No. 14/095,860, filed Dec. 3, 2013 Final Office Action mailed May 1, 2015, 18 pages.
U.S. Appl. No. 14/095,860, filed Dec. 3, 2013 Notice of Allowance mailed Jul. 13, 2015, 31 pages.

(56) References Cited

OTHER PUBLICATIONS

U.S. Appl. No. 14/095,860, filed Dec. 3, 2013 Notice of Allowance mailed Oct. 19, 2015, 14 pages.
Extended European Search Report for EP 11166892.7 dated Oct. 6, 2011, 7 pages.
U.S. Appl. No. 13/942,451, filed Jul. 15, 2013 Final Office Action mailed Apr. 30, 2015, 33 pages.
U.S. Appl. No. 13/942,451, filed Jul. 15, 2013 Non Final Office Action mailed Jul. 28, 2014, 27 pages.
U.S. Appl. No. 13/942,451, filed Jul. 15, 2013 Non Final Office Action mailed Jan. 8, 2016, 41 pages.
U.S. Appl. No. 13/942,451, filed Jul. 15, 2013 Final Office Action mailed Jun. 22, 2016, all pages.
U.S. Appl. No. 13/919,702, filed Jun. 17, 2013 Non Final Office Action mailed Jun. 11, 2014, 25 pages.
U.S. Appl. No. 13/919,702, filed Jun. 17, 2013 Final Office Action mailed Nov. 18, 2014, 24 pages.
U.S. Appl. No. 13/919,702, filed Jun. 17, 2013 Non-Final Office Action mailed Apr. 30, 2015, 26 pages.
U.S. Appl. No. 13/919,702, filed Jun. 17, 2013 Final Office Action mailed Dec. 31, 2015, 30 pages.
U.S. Appl. No. 13/919,702, filed Jun. 17, 2013 Non Final Office Action mailed Jun. 30, 2016, all pages.
U.S. Appl. No. 13/971,579, filed Aug. 20, 2013 Non Final Office Action mailed Oct. 28, 2014, 35 pages.
U.S. Appl. No. 13/971,579, filed Aug. 20, 2013 Notice of Allowance mailed Feb. 27, 2015, 28 pages.
U.S. Appl. No. 14/071,613, filed Nov. 4, 2013 Non-Final Office Action mailed May 18, 2015, 20 pages.
U.S. Appl. No. 14/071,613, filed Nov. 4, 2013 Final Office Action mailed Oct. 8, 2015, 11 pages.
U.S. Appl. No. 14/139,299, filed Dec. 23, 2013, Non Final Office Action mailed Aug. 14, 2015, 39 pages.
U.S. Appl. No. 14/139,299, filed Dec. 23, 2013, Final Office Action mailed Feb. 25, 2016, all pages.
U.S. Appl. No. 14/139,299, filed Dec. 23, 2013, Non Final Office Action mailed Jun. 20, 2016, all pages.
U.S. Appl. No. 14/139,420, filed Dec. 23, 2013 Non-Final Office Action mailed Apr. 30, 2015, 27 pages.
U.S. Appl. No. 14/139,420, filed Dec. 23, 2013 Notice of Allowance mailed Mar. 31, 2016, 37 pages.
U.S. Appl. No. 14/470,392, filed Aug. 27, 2014 Non Final Office Action mailed Nov. 5, 2015, 31 pages.
U.S. Appl. No. 14/470,392, filed Aug. 27, 2014 Final Office Action mailed Mar. 4, 2016, all pages.
U.S. Appl. No. 14/470,392, filed Aug. 27, 2014 Non-Final Office Action mailed Aug. 5, 2016, all pages.
U.S. Appl. No. 14/470,415, filed Aug. 27, 2014 Non Final Office Action mailed Nov. 18, 2015, 28 pages.
U.S. Appl. No. 14/470,415, filed Aug. 27, 2014 Final Office Action mailed Mar. 3, 2016, all pages.
U.S. Appl. No. 14/470,415, filed Aug. 27, 2014 Non Final Office Action mailed Jul. 29, 2016, all pages.
Jin S H et al., "Intelligent broadcasting system and services for personalized semantic contents consumption", Expert Systems With Applications, Oxford, GB, vol. 31, No. 1, Jul. 1, 2006, pp. 164-173, XP024962718, ISSN: 0957-4174, DOI: 10.1016/J.ESWA.2005.09.021.
Sung Ho Jin et al., "Real-time content filtering for live broadcasts in TV terminals", Multimedia Tools and Applications, Kluwer Academic Publishers, BO, vol. 36, No. 3, Jun. 29, 2007 pp. 285-301, XP019578768, ISSN: 1573-7721.
U.S. Appl. No. 14/470,248, filed Aug. 27, 2014, Final Office Action mailed Dec. 9, 2016, all pages.
U.S. Appl. No. 14/470,279, filed Aug. 27, 2014, Final Office Action mailed Dec. 9, 2016, all pages.
U.S. Appl. No. 14/591,474, filed Jan. 7, 2015, Non-Final Office Action mailed Dec. 16, 2016, 32 pages.
U.S. Appl. No. 13/942,451, filed Jul. 15, 2013 Non Final Office Action mailed Oct. 25, 2016, all pages.
U.S. Appl. No. 13/919,702, filed Jun. 17, 2013 Final Office Action mailed Oct. 28, 2016, all pages.

* cited by examiner

MOSAIC FOCUS CONTROL

CROSS REFERENCES TO RELATED APPLICATIONS

This application is a continuation of U.S. patent application Ser. No. 14/139,420, entitled "Mosaic Focus Control," filed Dec. 23, 2013, which is related to U.S. patent application Ser. No. 14/139,299, entitled "Customized Video Mosaic," filed Dec. 23, 2013. This related patent application is incorporated by reference in its entirety for all purposes.

BACKGROUND

Television users have become accustomed to increased flexibility when watching television. Often, when a television channel goes to a commercial break, a user may change the channel to a second television channel, which may not be on a commercial break. Sometimes, however, the second television channel may also be on a commercial break. In such a circumstance, the user may flip back and forth between the two channels until one of the channels returns from commercial or the user may try a third television channel. Such an arrangement can require a substantial amount of user interaction and can be a source of user frustration.

SUMMARY

In some embodiments, a television receiver is presented. The television receiver may include one or more processors. The television receiver may include a memory communicatively coupled with, and readable by, the one or more processors and having stored therein processor-readable instructions. The instructions, when executed by the one or more processors, may cause the one or more processors to receive, from a user of the television receiver, a set of viewing rules that define a focus preference of the user. The instructions may cause the one or more processors to cause the television receiver to output, to a presentation device, a video mosaic comprising a plurality of pieces of content presented as a plurality of tiles, wherein each piece of content is linked with a corresponding audio stream from a plurality of audio streams. The instructions may cause the one or more processors to select a piece of content for focus from the plurality of pieces of content based on the set of viewing rules defined by the user. The instructions may cause the one or more processors to cause the television receiver to output only an audio stream linked with the piece of content being focused on from among the plurality of audio streams.

Embodiments of such a television receiver may include one or more of the following features: The set of viewing rules may define a preferred focus order. The set of viewing rules may be defined by the user such that the piece of content of the plurality of pieces of content is removed from focus if the piece of content is presenting a commercial. The instructions may cause the one or more processors to determine the piece of content being focused on has commenced presenting the commercial. The instructions may cause the one or more processors to select a second piece of content from the plurality of pieces of content based on the preferred focus order indicated in the set of viewing rules. The instructions may cause the one or more processors to cause the television receiver to output a second audio stream linked with the second piece of content being focused on, wherein only the second audio stream is output from among the plurality of audio streams. The instructions may cause the one or more processors to, based on the piece of content being focused on, increase an area of presentation on the presentation device dedicated to the piece of content. The instructions may cause the one or more processors to receive an audio lock command that selects the audio stream from the plurality of audio streams. The instructions may cause the one or more processors to, in response to the audio lock command, output the selected audio stream regardless of focus. The instructions may cause the one or more processors to receive a selection of a content category. The instructions may cause the one or more processors to, in response to the selection, determine the plurality of pieces of content for presentation in the video mosaic.

Additionally or alternatively, embodiments of such a television receiver may include one or more of the following features: The instructions may cause the one or more processors to receive a plurality of content tags, wherein each content tag is associated with a characteristic of a particular piece of content. The instructions may cause the one or more processors to determine the piece of content being focused on has commenced a commercial break based on a content tag of the plurality of content tags. The instructions may cause the one or more processors to select a second piece of content from the plurality of pieces of content based on the preferred focus order indicated in the set of viewing rules. The instructions may cause the one or more processors to cause the television receiver to output a second audio stream linked with the second piece of content being focused on, wherein only the second audio stream is output from among the plurality of audio streams.

In some embodiments, a method for presenting content is described. The method may include receiving, by a television receiver from a user, a set of viewing rules that define a focus preference of the user. The method may include outputting, by the television receiver to a presentation device, a video mosaic comprising a plurality of pieces of content presented as a plurality of tiles, wherein each piece of content is linked with a corresponding audio stream from a plurality of audio streams. The method may include selecting, by the television receiver, a piece of content for focus from the plurality of pieces of content based on the set of viewing rules defined by the user. The method may include outputting, by the television receiver, only an audio stream linked with the piece of content being focused on from among the plurality of audio streams.

Embodiments of such a method may include one or more of the following features: The set of viewing rules may define a preferred focus order. The set of viewing rules may be defined by the user such that the piece of content of the plurality of pieces of content is removed from focus if the piece of content is presenting a commercial. The method may include determining, by the television receiver, the piece of content being focused on has commenced presenting the commercial. The method may include selecting, by the television receiver, a second piece of content from the plurality of pieces of content based on the preferred focus order indicated in the set of viewing rules. The method may include outputting, by the television receiver, a second audio stream linked with the second piece of content being focused on, wherein only the second audio stream is output from among the plurality of audio streams. The method may include, based on the piece of content being focused on, increasing, by the television receiver, an area of presentation on the presentation device dedicated to the piece of content. The method may include receiving, by the television receiver, an audio lock command that selects the audio stream from the plurality of audio streams. The method may include in response to the audio lock command, outputting, by the television receiver, the selected audio stream regardless of focus. The method may include receiving, by the television receiver, a selection of a content category. The method may include in response to the selection, determining, by the television receiver, the plurality of pieces of content for presentation in the video mosaic. The method may include receiving, by the television receiver, a plurality of content tags, wherein each content tag is associated with a characteristic of a particular piece of content. The method may include determining, by the television receiver, the piece of content being focused on has commenced a commercial break based on a content tag of the plurality of content tags. The method may include selecting, by the television receiver, a second piece of content from the plurality of pieces of content based on the preferred focus order indicated in the set of viewing rules. The method may include outputting, by the television receiver, a second audio stream linked with the second piece of content being focused on, wherein only the second audio stream is output from among the plurality of audio streams.

In some embodiments, a non-transitory processor-readable medium for presenting content, comprising processor-readable instructions is presented. The instructions may be configured to cause one or more processors to receive, from a user of a television receiver, a set of viewing rules that define a focus preference of the user. The instructions may be configured to cause one or more processors to cause the television receiver to output, to a presentation device, a video mosaic comprising a plurality of pieces of content presented as a plurality of tiles, wherein each piece of content is linked with a corresponding audio stream from a plurality of audio streams. The instructions may be configured to cause one or more processors to select a piece of content for focus from the plurality of pieces of content based on the set of viewing rules defined by the user. The instructions may be configured to cause one or more processors to cause the television receiver to output only an audio stream linked with the piece of content being focused on from among the plurality of audio streams.

Embodiments of such a non-transitory processor-readable medium may include one or more of the following features: The set of viewing rules may define a preferred focus order. The set of viewing rules may be defined by the user such that the piece of content of the plurality of pieces of content is removed from focus if the piece of content is presenting a commercial. The instructions may be configured to cause one or more processors to determine the piece of content being focused on has commenced presenting the commercial. The instructions may be configured to cause one or more processors to select a second piece of content from the plurality of pieces of content based on the preferred focus order indicated in the set of viewing rules. The instructions may be configured to cause one or more processors to cause the television receiver to output a second audio stream linked with the second piece of content being focused on, wherein only the second audio stream is output from among the plurality of audio streams.

BRIEF DESCRIPTION OF THE DRAWINGS

A further understanding of the nature and advantages of various embodiments may be realized by reference to the following figures. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Figure 1:
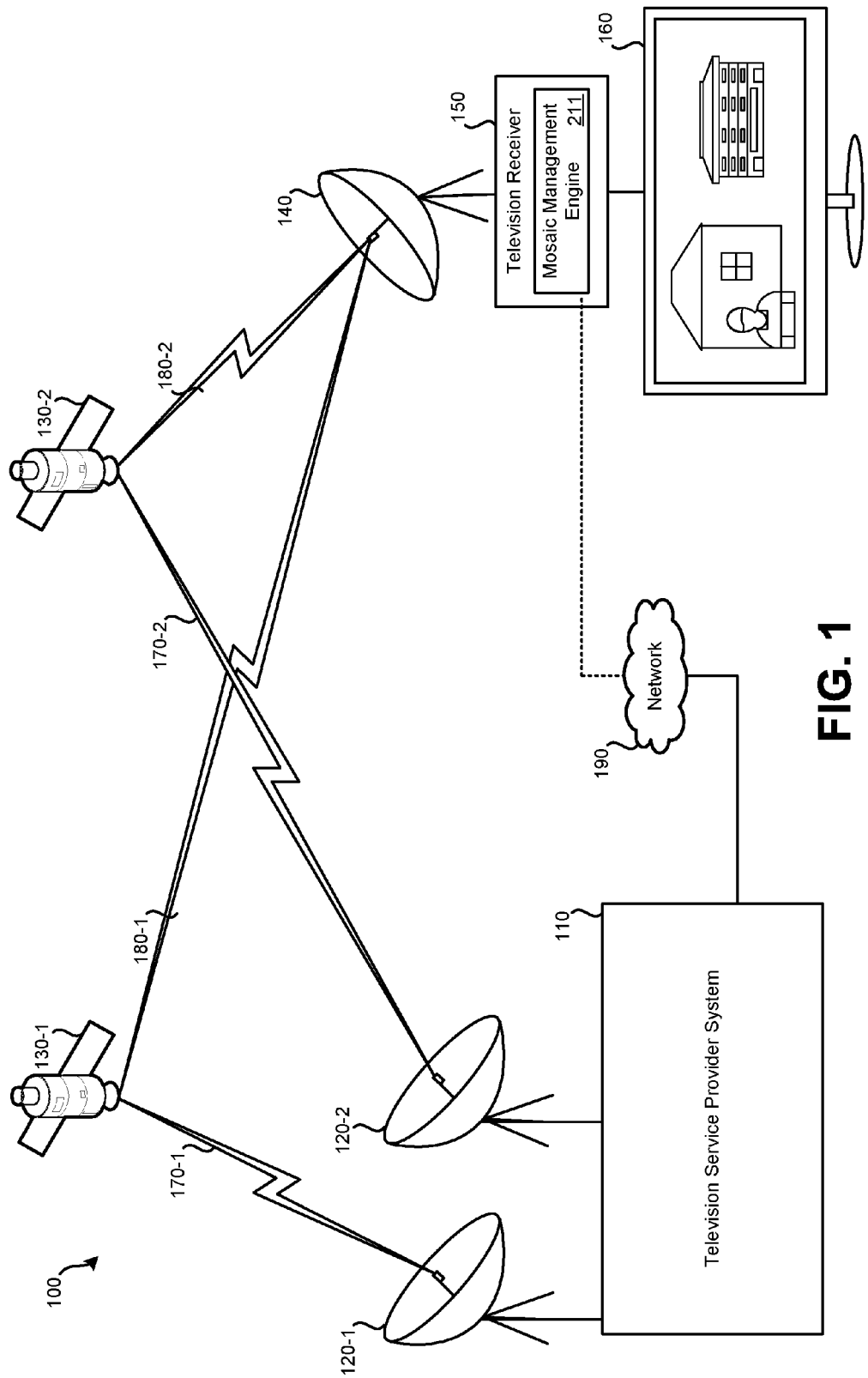
FIG. 1 illustrates an embodiment of a television service provider system.

A customized video mosaic (CVM) may be output for presentation by a television receiver. A CVM may permit a user to simultaneously view multiple pieces of content in the form of video streams. Pieces of content may include broadcast television, content that was recorded by a television receiver (e.g., from a broadcast), web-based content, and/or on-demand content. For example, a CVM may be used to present multiple television channels that are each currently broadcasting content in a particular category, such as sports.

While a CVM may include multiple pieces of video content being output simultaneously, only a single audio stream associated with one of the pieces of content may be output at a time. The audio stream that is output may correspond to the piece of content on which it is currently being focused. Focus may be determined based on user-defined rules. A user may configure which pieces of content are presented in the CVM or, in some embodiments, the user may select a category of content (e.g., sports, reality, news, etc.), which is then used by the television receiver to select the pieces of content (e.g., television channels being broadcast, stored content, web content, on-demand content) for presentation. The user may define a preferred focus order as part of the user-defined rules. Such an ordering may be stored and reloaded from a previous session of the user with the television receiver. The preferred focus order may be in the form of a content (e.g., television channel) ranking. The piece of content highest in rank may be focused on, unless an undesired characteristic is present, such as the piece of content presenting a commercial. If the undesired characteristic is present, the second piece of content according to rank may be presented, unless the undesired characteristic is also present. A ranking may continue down the ranking of the preferred focus order until a piece of content is identified having the desired characteristics. Once the highest ranked piece of content according to the preferred focus order no longer has the undesired characteristic, focus may return to the highest ranked piece of content without user input. As such, focus may shift among multiple pieces of content according to the user-defined rules without requiring user input.

In some embodiments, each piece of content may be associated with content metadata tags that are inserted in the stream of data that includes the pieces of content. Such metadata tags can be used to signal the beginning and end of commercial breaks and other characteristics of content present in the piece of content (e.g., live action, replay, video of announcers, in-program promotions, etc.). Beyond specifying how the CVM should behave when a commercial break begins and ends, the user may be able to specify how the CVM should be adjusted based on other characteristics of the piece of content.

In some embodiments, a CVM may include a number of tiles, with each tile presenting a different piece of content. Audio output may be associated with a particular tile/piece of content. In some embodiments, the piece of content that has focus may be output for display in a larger display tile than other video streams (e.g., a picture-in-picture arrangement). While the user may be permitted to switch focus between tiles of the CVM, focus can also be handled according to user-defined rules. If the user desires such handling of focus according to the rules to be ceased, the user may be permitted to lock focus or lock only audio focus.

Such a CVM may be implemented in a satellite based television system. FIG. 1 illustrates an embodiment of a satellite television distribution system 100. Satellite television distribution system 100 may include: television service provider system 110, satellite transmitter equipment 120, satellites 130, satellite dish 140, television receiver 150, and display device 160. Alternate embodiments of satellite television distribution system 100 may include fewer or greater numbers of components. While only one satellite dish 140, television receiver 150, and display device 160 (collectively referred to as "user equipment") are illustrated, it should be understood that multiple (e.g., tens, thousands, millions) instances of user equipment may receive television signals from television service provider system 110 via satellites 130.

Television service provider system 110 and satellite transmitter equipment 120 may be operated by a television service provider. A television service provider may distribute television channels, on-demand programming, programming information, and/or other content/services to users. Television service provider system 110 may receive feeds of one or more television channels from various sources. Such television channels may include multiple television channels that contain at least some of the same content (e.g., network affiliates). To distribute television channels for presentation to users, feeds of the television channels may be relayed to user equipment via multiple television distribution satellites. Each satellite may relay multiple transponder streams. Satellite transmitter equipment 120 (120-1, 120-2) may be used to transmit a feed of one or more television channels from television service provider system 110 to one or more satellites 130. While a single television service provider system 110 and satellite transmitter equipment 120 are illustrated as part of satellite television distribution system 100, it should be understood that multiple instances of transmitter equipment may be used, possibly scattered geographically, to communicate with satellites 130. Such multiple instances of satellite transmitting equipment may communicate with the same or with different satellites. Different television channels may be transmitted to satellites 130 from different instances of transmitting equipment. For instance, a different satellite dish of satellite transmitter equipment 120 may be used for communication with satellites in different orbital slots.

Satellites 130 may be configured to receive signals, such as streams of television channels, from one or more satellite uplinks such as satellite transmitter equipment 120. Satellites 130 may relay received signals from satellite transmitter equipment 120 (and/or other satellite transmitter equipment) to multiple instances of user equipment via transponder streams. Different frequencies may be used for uplink signals 170 from transponder streams 180. Satellites 130 may be in geosynchronous orbit. Each of the transponder streams transmitted by satellites 130 may contain multiple television channels transmitted as packetized data. For example, a single transponder stream may be a serial digital packet stream containing multiple television channels. Therefore, packets for multiple television channels may be interspersed.

Multiple satellites 130 may be used to relay television channels from television service provider system 110 to satellite dish 140. Different television channels may be carried using different satellites. Different television channels may also be carried using different transponders of the same satellite; thus, such television channels may be transmitted at different frequencies and/or different frequency ranges. As an example, a first and second television channel may be relayed via a first transponder of satellite 130-1. A third, fourth, and fifth television channel may be relayed via a different satellite or a different transponder of the same satellite relaying a transponder stream at a different frequency. A transponder stream transmitted by a particular transponder of a particular satellite may include a finite number of television channels, such as seven. Accordingly, if many television channels are to be made available for viewing and recording, multiple transponder streams may be necessary to transmit all of the television channels to the instances of user equipment. Each transponder stream may be able to carry a finite amount of data. As such, the number of television channels that can be included in a particular transponder stream may be at least partially dependent on the resolution of the video of the television channel. For example, a transponder stream may be able to carry seven or eight television channels at a high resolution, but may be able to carry dozens, fifty, a hundred, two hundred, or some other number of television channels at reduced resolutions.

Satellite dish 140 may be a piece of user equipment that is used to receive transponder streams from one or more satellites, such as satellites 130. Satellite dish 140 may be provided to a subscriber for use on a subscription basis to receive television channels provided by the television service provider system 110, satellite transmitter equipment 120, and/or satellites 130. Satellite dish 140, which may include one or more low noise blocks (LNBs), may be configured to receive transponder streams from multiple satellites and/or multiple transponders of the same satellite. Satellite dish 140 may be configured to receive television channels via transponder streams on multiple frequencies. Based on the characteristics of television receiver 150 and/or satellite dish 140, it may only be possible to capture transponder streams from a limited number of transponders concurrently. For example, a tuner of television receiver 150 may only be able to tune to a single transponder stream from a transponder of a single satellite at a given time. The tuner can then be re-tuned to another transponder of the same or a different satellite. A television receiver 150 having multiple tuners may allow for multiple transponder streams to be received at the same time.

Figure 2:
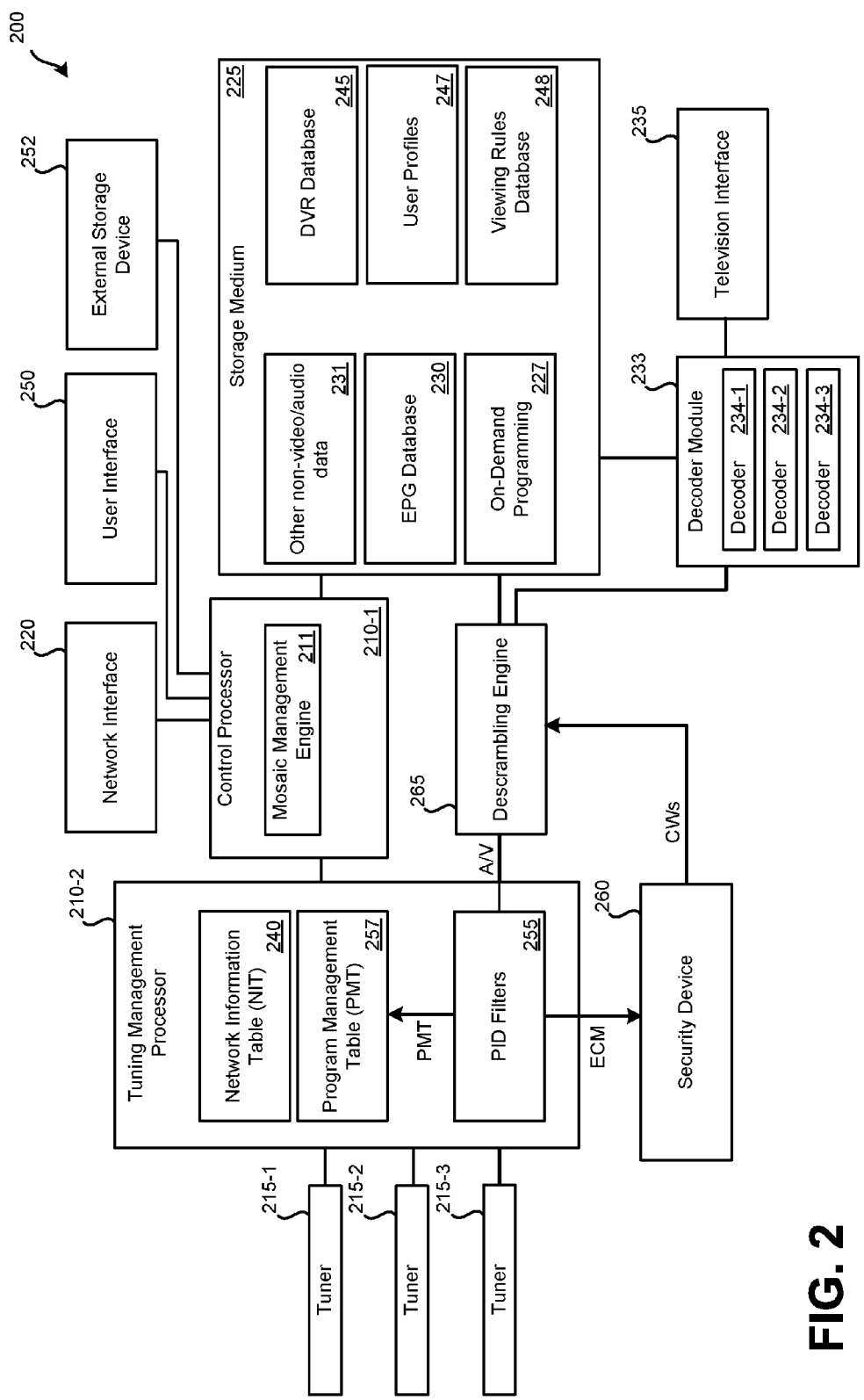
FIG. 2 illustrates an embodiment of a television receiver configured to present a customized video mosaic.

In communication with satellite dish 140 may be one or more television receivers. Television receivers may be configured to decode signals received from satellites 130 via satellite dish 140 for output and presentation via a display device, such as display device 160. A television receiver may be incorporated as part of a television or may be part of a separate device, commonly referred to as a set-top box (STB). Television receiver 150 may decode signals received via satellite dish 140 and provide an output to display device 160. FIG. 2 provides additional detail of various embodiments of a television receiver. A television receiver is defined to include set-top boxes (STBs) and also circuitry having similar functionality that may be incorporated with another device. For instance, circuitry similar to that of a television receiver may be incorporated as part of a television. As such, while FIG. 1 illustrates an embodiment of television receiver 150 as separate from display device 160, it should be understood that, in other embodiments, similar functions may be performed by a television receiver integrated with display device 160. Television receiver 150 may include a mosaic management engine 211 that configures and manages a CVM that is output for display to display device 160.

Display device 160 may be used to present video and/or audio decoded and output by television receiver 150. Television receiver 150 may also output a display of one or more interfaces to display device 160, such as an electronic programming guide (EPG). In many embodiments, display device 160 is a television. Display device 160 may also be a monitor, computer, or some other device configured to display video and, possibly, play audio.

Uplink signal 170-1 represents a signal between satellite transmitter equipment 120 and satellite 130-1. Uplink signal 170-2 represents a signal between satellite transmitter equipment 120 and satellite 130-2. Each of uplink signals 170 may contain streams of one or more different television channels. For example, uplink signal 170-1 may contain a first group of television channels, while uplink signal 170-2 contains a second group of television channels. Each of these television channels may be scrambled such that unauthorized persons are prevented from accessing the television channels.

Transponder stream 180-1 represents a transponder stream signal between satellite 130-1 and satellite dish 140. Transponder stream 180-2 represents a transponder stream signal between satellite 130-2 and satellite dish 140. Each of transponder streams 180 may contain one or more different television channels, which may be at least partially scrambled. For example, transponder stream 180-1 may be a first transponder stream containing a first group of television channels, while transponder stream 180-2 may be a second transponder stream containing a different group of television channels. When a television channel is received as part of a transponder stream and is decoded and output to display device 160 (rather than first storing the television channel to a storage medium as part of DVR functionality then later outputting the television channel from the storage medium), the television channel may be considered to be viewed "live."

FIG. 1 illustrates transponder stream 180-1 and transponder stream 180-2 being received by satellite dish 140 and distributed to television receiver 150. For a first group of television channels, satellite dish 140 may receive transponder stream 180-1 and for a second group of channels, transponder stream 180-2 may be received. Television receiver 150 may decode the received transponder streams. As such, depending on which television channels are desired to be presented or stored, various transponder streams from various satellites may be received, descrambled, and decoded by television receiver 150.

Network 190 may serve as a secondary communication channel between television service provider system 110 and television receiver 150. However, in many instances, television receiver 150 may be disconnected from network 190 (for reasons such as because television receiver 150 is not configured to connect to network 190 or a subscriber does not desire or cannot connect to network 190). As such, the connection between network 190 and television receiver 150 is represented by a dotted line. Via such a secondary communication channel, bidirectional exchange of data may occur. As such, data may be transmitted to television service provider system 110 from television receiver 150 via network 190. Data may also be transmitted from television service provider system 110 to television receiver 150 via network 190. Network 190 may be the Internet. While audio and video services may be provided to television receiver 150 via satellites 130, feedback from television receiver 150 to television service provider system 110 may be transmitted via network 190.

FIG. 2 illustrates an embodiment of television receiver 200. Television receiver 200 may be configured to output for presentation of a CVM. Television receiver 200 may be in the form of a separate device configured to be connected with a display device, such as a television. Embodiments of television receiver 200 can include set top boxes (STBs). As previously noted, in addition to being in the form of an STB, a television receiver may be incorporated as part of another device, such as a television, other form of display device, video game console, computer, mobile phone or tablet or the like. For example, a television may have an integrated television receiver (which does not involve an external STB being coupled with the television).

Television receiver 200 may represent television receiver 150 of FIG. 1 and may be in the form of an STB that outputs video and/or audio to a display device, such as a television. Television receiver 200 may be incorporated as part of a television, such as display device 160 of FIG. 1. Television receiver 200 may include: processors 210 (which may include control processor 210-1, tuning management processor 210-2, and possibly additional processors), tuners 215, network interface 220, non-transitory computer-readable storage medium 225, electronic programming guide (EPG) database 230, television interface 235, networking information table (NIT) 240, digital video recorder (DVR) database 245 (which may include provider-managed television programming storage and/or user-defined television programming), on-demand programming 227, user profiles 247, user interface 250, external storage device 252, security device 260, and/or descrambling engine 265. In other embodiments of television receiver 200, fewer or greater numbers of components may be present. It should be understood that the various components of television receiver 200 may be implemented using hardware, firmware, software, and/or some combination thereof. Functionality of components may be combined; for example, functions of descrambling engine 265 may be performed by tuning management processor 210-2. Further, functionality of components may be spread among additional components; for example, PID (packet identifier) filters 255 may be handled by separate hardware from program management table 257.

Processors 210 may include one or more specialized and/or general-purpose processors configured to perform processes such as tuning to a particular channel, accessing and displaying EPG information from EPG database 230, and/or receiving and processing input from a user. For example, processors 210 may include one or more processors dedicated to decoding video signals from a particular format, such as MPEG, for output and display on a television and for performing decryption. It should be understood that the functions performed by various modules of FIG. 2 may be performed using one or more processors. As such, for example, functions of descrambling engine 265 may be performed by control processor 210-1.

Control processor 210-1 may communicate with tuning management processor 210-2. Control processor 210-1 may control the recording of television channels based on timers stored in DVR database 245. Control processor 210-1 may also provide commands to tuning management processor 210-2 when recording of a television channel is to cease. In addition to providing commands relating to the recording of television channels, control processor 210-1 may provide commands to tuning management processor 210-2 that indicate television channels to be output to decoder module 233 for output to a display device. Control processor 210-1 may also communicate with network interface 220 and user interface 250. Control processor 210-1 may handle incoming data from network interface 220 and user interface 250. Additionally, control processor 210-1 may be configured to output data via network interface 220.

Control processor 210-1 may include a mosaic management engine 211. Embodiments of a mosaic management engine 211 are described in relation to FIG. 3.

Tuners 215 may include one or more tuners used to tune to transponders that include broadcasts of one or more television channels. In the illustrated embodiment of television receiver 200, three tuners are present (tuner 215-1, tuner 215-2, and tuner 215-3). In other embodiments, two or more than three tuners may be present, such as four, six, or eight tuners. Each tuner contained in tuners 215 may be capable of receiving and processing a single transponder stream from a satellite transponder at a given time. As such, a single tuner may tune to a single transponder stream at a given time. If tuners 215 include multiple tuners, one tuner may be used to tune to a television channel on a first transponder stream for display using a television, while another tuner may be used to tune to a television channel on a second transponder for recording and viewing at some other time. If multiple television channels transmitted on the same transponder stream are desired, a single tuner of tuners 215 may be used to receive the signal containing the multiple television channels for presentation and/or recording. Tuners 215 may receive commands from tuning management processor 210-2. Such commands may instruct tuners 215 which frequencies are to be tuned to.

Network interface 220 may be used to communicate via an alternate communication channel with a television service provider, if such communication channel is available. The primary communication channel may be via satellite (which may be unidirectional to television receiver 200) and the alternate communication channel (which may be bidirectional) may be via a network, such as the Internet. Referring back to FIG. 1, television receiver 150 may be able to communicate with television service provider system 110 via a network, such as the Internet. This communication may be bidirectional: data may be transmitted from television receiver 150 to television service provider system 110 and from television service provider system 110 to television receiver 150. Referring back to FIG. 2, network interface 220 may be configured to communicate via one or more networks, such as the Internet, to communicate with television service provider system 110 of FIG. 1. Information may be transmitted and/or received via network interface 220. For instance, instructions (e.g., regarding subscription portability) from a television service provider may also be received via a network interface 220, if connected with the Internet. Network interface 220 may be used to provide a confirmation to a television service provider that instructions received from the television service provider have indeed been executed.

Storage medium 225 may represent one or more non-transitory computer-readable storage mediums. Storage medium 225 may include memory and/or a hard drive. Storage medium 225 may be used to store information received from one or more satellites and/or information received via network interface 220. Storage medium 225 may store information related to EPG database 230, other non-video/audio data 231, DVR database 245, user profiles 247, and/or on-demand programming 227. Recorded television programs may be stored using storage medium 225 as part of DVR database 245. Storage medium 225 may be partitioned or otherwise divided (such as into folders) such that predefined amounts of storage medium 225 are devoted to storage of television programs recorded due to user-defined timers and stored television programs recorded due to provider-defined timers.

EPG database 230 may store information related to television channels and the timing of programs appearing on such television channels. EPG database 230 may be stored using storage medium 225, which may be a hard drive. Information from EPG database 230 may be used to inform users of what television channels or programs are popular and/or provide recommendations to the user. Information from EPG database 230 may provide the user with a visual interface displayed by a television that allows a user to browse and select television channels and/or television programs for viewing and/or recording. Information used to populate EPG database 230 may be received via network interface 220 and/or via satellites, such as satellites 130 of FIG. 1 via tuners 215. For instance, updates to EPG database 230 may be received periodically via satellite. EPG database 230 may serve as an interface for a user to control DVR functions of television receiver 200, and/or to enable viewing and/or recording of multiple television channels simultaneously.

The network information table (NIT) 240 may store information used by television receiver 200 to access various television channels. NIT 240 may be stored locally by a processor, such as tuning management processor 210-2 and/or by storage medium 225. Information used to populate NIT 240 may be received via satellite (or cable) through tuners 215 and/or may be received via network interface 220 from the television service provider. As such, information present in NIT 240 may be periodically updated. In some embodiments, NIT 240 may be locally-stored by television receiver 200 using storage medium 225. Generally, NIT 240 may store information about a service provider network, such as a satellite-based service provider network. Information that may be present in NIT 240 may include: television channel numbers, satellite identifiers (which may be used to ensure different satellites are tuned to for reception of timing signals), frequency identifiers and/or transponder identifiers for various television channels. In some embodiments, NIT 240 may contain additional data or additional tables may be stored by the television receiver. For example, while specific audio PIDs and video PIDs may not be present in NIT 240, a channel identifier may be present within NIT 240 which may be used to look up the audio PIDs and video PIDs in another table, such as a program map table (PMT). In some embodiments, a PID associated with the data for the PMT is indicated in a separate table, program association table (PAT), which is not illustrated in FIG. 2. A PAT may be stored by the television receiver in a similar manner to the NIT. For example, a PMT may store information on audio PIDs, and/or video PIDs. A PMT stores data on ECM (entitlement control message) PIDs for television channels that are transmitted on a transponder frequency. If, for a first television channel, multiple television channels are to be tuned to, NIT 240 and/or PMT 257 may indicate a second television channel that is to be tuned to when a first channel is tuned to.

Based on information in the NIT, it may be possible to determine the proper satellite and transponder to which to tune for a particular television channel. In some embodiments, the NIT may list a particular frequency to which to tune for a particular television channel. Once tuned to the proper satellite/transponder/frequency, the PMT PID may be used to retrieve a program management table that indicates the PIDs for audio and video streams of television channels transmitted by that transponder.

While a large portion of storage space of storage medium 225 is devoted to storage of television programming, a portion may be devoted to storage of non-audio/video data, such as EPG database 230 and other non-video/audio data 231. This "other" data may permit television receiver 200 to function properly. In some embodiments, at least ten gigabytes are allocated to such other data. For example, if NIT 240 is stored by storage medium 225, it may be part of other non-video/audio data 226.

User profiles 247 may include stored user preferences. For example, a user may specify a preferred category of television programming, such as: sports, news, movies, sitcoms, reality, etc. The user may also specify whether they prefer broadcast ("live") television, on-demand programming, or recorded television programming (via user or provider-defined timers). In some embodiments, data for a user's profile may be defined based on measured viewing habits, such as which television channels and/or categories of television programming does the user watch. User profiles 247 may specify which television programs were recorded based on timers set by the user associated with a specific user profile. User profiles 247 may include profiles for multiple users or may include a single profile for the television receiver in general. In some embodiments, a user is permitted to select which user profile of user profiles 247 is active. For instance, a user can log on to television receiver 200. In other embodiments, the television receiver 200 may be configured to identify a user and select a user profile 247 for use automatically, such as through facial recognition using an associated image capture device, biometric recognition, such as a fingerprint detection device incorporated into a remote control or identification through devices carried on a person, such as RFID, NFC cards or pairing to a mobile communication device.

Viewing rules database 248 may be used for storage of user-defined viewing rules. Viewing rules stored in viewing rules database 248 can be used to define what content should receive focus in a CVM. Such viewing rules can include orderings of television channels. An ordering may list television channels from the most desired to the least desired. If a user does not ever desire the television channel to be presented as part of the CVM, the user may be permitted to delete the television channel from the ordering. After a user has created an ordering, the ordering may be saved for future use (e.g., to allow a user to recall a previously created ordering and/or to anticipate the user's preferred ordering).

For example, if a user defines an ordering of television channels to be, from most preferred to least preferred: 4, 7, 29, 27, 2. Future orderings that have at least partial overlap with this ordering may use the ordering as a baseline. For instance, if a future ordering also included television channels 7 and 27, the future ordering may be initially created to have television channel 7 listed ahead of television channel 27 due to the user's previously indicated preference. While an ordering may include just live broadcast television channels, stored content and/or web content may also be included. For instance, a webpage, such as a webpage that lists sports scores, may be included. This webpage may be updated and focused on in accordance with the user's viewing rules. Stored content (e.g., recorded content) and/or on-demand content may also be included in the ordering. Stored content and/or on-demand content may be configured to play continuously regardless of focus, or may only play when focus is on the stored or on-demand content (otherwise, the stored or on-demand content may be paused). As an example, a user may select the broadcast of channel 4 as his highest priority, but focus may be passed to a recording of a television program from a different channel upon occurrence of one or more conditions.

Viewing rules stored in viewing rules database 248 can be used to define one or more front-end switch conditions for focus in a CVM. A user may be permitted to select among various switch conditions. Front-end switch conditions may be used to define a first set of criteria that are evaluated when determining whether a focus switch should occur. For instance, front-end switch conditions may correspond to events including: start of a commercial break, start of an in-program promotion, end of a scoring opportunity, start of a replay, the start of non-field-of-play video (e.g., camera shots of sports announcers), etc. The front-end condition may conclude when the commercial break, in-program promotion, or some other event ends. The user may be presented with a listing of front-end switch conditions from which the user is permitted to select. The user may be permitted to select one or more front-end switch conditions. By default, the switch condition which may be set is the start of a commercial break.

Viewing rules stored in viewing rules database 248 can be used to define one or more back-end switch conditions. Back-end switch conditions may function in concert with front-end switch conditions to determine if and/or when focus should be shifted in a CVM. Back-end switch conditions may be used to determine whether a different piece of content should receive focus following a front-end switch condition being detected. Back-end switch conditions may involve monitoring the most desired content according to the ordering to determine when the front-end switch condition has concluded. For instance, if the front-end switch condition was the start of a commercial break, the front-end switch condition may conclude at the end of the commercial break. Upon occurrence of a back-end switch condition, focus may return to the higher ranked content according to the stored ordering. Back-end switch routing conditions (in combination with a content ordering) may define what is to occur, if anything, following a front-end switch condition being detected or concluded. For instance, options are defined in Table 1 below. In Table 1, a user may select how the back-end switch is to be implemented. Characteristics and/or options that correspond to the user's selected back-end switch may then be displayed or made available for selection.

TABLE 1

| When to implement back-end switch | How to implement Ordering | Audio Lock | Stored/on-demand content handling | Web content handling |
|---|---|---|---|---|
| Immediately on front-end switch condition ending for highest ranked content | Return focus to highest ranked content | Options: 1) Lock audio on most preferred content; 2) Audio is output for content currently being focused on; 3) Audio is output based on user selection. | Options: 1) Continuous playback regardless of focus; 2) Pause unless focused on. | Options: 1) Never have focus; 2) Focus only until other content has front-end switch condition end (minimum focus time of x seconds); 3) Update every x seconds/minutes. |
| Immediately on front-end switch condition ending for any higher ranked content | Return focus to corresponding higher ranked content on which front-end switch condition ended | Options: 1) Lock audio on most preferred content; 2) Audio is output for content currently being focused on; 3) Audio is output based on user selection. | Options: 1) Continuous playback regardless of focus; 2) Pause unless focused on. | Options: 1) Never have focus; 2) Focus only until other content has front-end switch condition end (minimum focus time of x seconds); 3) Update every x seconds/minutes. |
| When a front-end switch condition occurs on focused content | Options: 1) Return to highest ranked content; 2) Return to highest ranked content if front-end switch condition has ended; 3) Return to higher ranked content on which front-end switch condition has ended; 4) Proceed to next piece of content listed in ordering; 5) Proceed to next piece of content listed in ordering if front-end condition is not present | Options: 1) Lock audio on most preferred content; 2) Audio is output for content currently being focused on; 3) Audio is output based on user selection. | Options: 1) Continuous playback regardless of focus; 2) Pause unless focused on. | Options: 1) Never have focus; 2) Focus only until other content has front-end switch condition end (minimum focus time of x seconds); 3) Update every x seconds/minutes. |

An additional back-end switch condition may be a threshold period of time. A user may not be desirable of switches occurring at too high of a rate or over too short of a period of time. A user-defined setting may define a minimum amount of time on which focus on a piece of content must be maintained until focus is permitted to be moved, such as 10, 20, or 30 seconds (or some other shorter or longer period of time). An exception may be available for the highest ranked piece of content ("switch focus to highest ranked piece of content regardless of defined time threshold").

Decoder module 233 may serve to convert encoded video and audio into a format suitable for output to a display device. For instance, decoder module 233 may receive MPEG video and audio from storage medium 225 or descrambling engine 265 to be output to a television. MPEG video and audio from storage medium 225 may have been recorded to DVR database 245 as part of a previously-recorded television program. Decoder module 233 may convert the MPEG video and audio into a format appropriate to be displayed by a television or other form of display device and audio into a format appropriate to be output from speakers, respectively. Decoder module 233 may have the ability to convert a finite number of television channel streams received from storage medium 225 or descrambling engine 265, simultaneously. For instance, each of decoders 234 within decoder module 233 may be able to only decode a single television channel at a time. While decoder module 233 is illustrated as having three decoders 234 (decoder 234-1, decoder 234-2, and decoder 234-3), in other embodiments, a greater or fewer number of decoders may be present in television receiver 200. A decoder may be able to only decode a single high definition television program at a time. However, a decoder may be able to decode multiple preview clips at the same time. Therefore, if nine preview clips are being presented as tiles in a CVM simultaneously, only one or two decoders of decoders 234 may be necessary to decode the encoded preview clips.

Television interface 235 may serve to output a signal to a television (or another form of display device) in a proper format for display of video and playback of audio. As such, television interface 235 may output one or more television channels, stored television programming from storage medium 225 (e.g., television programs from DVR database 245, television programs from on-demand programming 230 and/or information from EPG database 230) to a television for presentation. Television interface 235 may also serve to output a CVM.

Digital Video Recorder (DVR) functionality may permit a television channel to be recorded for a period of time. DVR functionality of television receiver 200 may be managed by control processor 210-1. Control processor 210-1 may coordinate the television channel, start time, and stop time of when recording of a television channel is to occur. DVR database 245 may store information related to the recording of television channels. DVR database 245 may store timers that are used by control processor 210-1 to determine when a television channel should be tuned to and its programs recorded to DVR database 245 of storage medium 225. In some embodiments, a limited amount of storage medium 225 may be devoted to DVR database 245. Timers may be set by the television service provider and/or one or more users of television receiver 200.

DVR database 245 may also be used to record recordings of service provider-defined television channels. For each day, an array of files may be created. For example, based on provider-defined timers, a file may be created for each recorded television channel for a day. For example, if four television channels are recorded from 6-10 PM on a given day, four files may be created (one for each television channel). Within each file, one or more television programs may be present. The service provider may define the television channels, the dates, and the time periods for which the television channels are recorded for the provider-defined timers. The provider-defined timers may be transmitted to television receiver 200 via the television provider's network. For example, referring to satellite television distribution system 100 of FIG. 1, in a satellite-based television service provider system, data necessary to create the provider-defined timers at television receiver 150 may be received via satellite.

As an example of DVR functionality of television receiver 200 being used to record based on provider-defined timers, a television service provider may configure television receiver 200 to record television programming on multiple, predefined television channels for a predefined period of time, on predefined dates. For instance, a television service provider may configure television receiver 200 such that television programming may be recorded from 7 to 10 PM on NBC, ABC, CBS, and FOX on each weeknight and from 6 to 10 PM on each weekend night on the same channels. These channels may be transmitted as part of a single transponder stream such that only a single tuner needs to be used to receive the television channels. Packets for such television channels may be interspersed and may be received and recorded to a file. If a television program is selected for recording by a user and is also specified for recording by the television service provider, the user selection may serve as an indication to save the television program for an extended time (beyond the time which the predefined recording would otherwise be saved). Television programming recorded based on provider-defined timers may be stored to a portion of storage medium 225 for provider-managed television programming storage.

DVR Database 245 may also store television programming that is recorded based on analysis of user profiles 247. For instance, if a user frequently watches and/or records sports, a major sporting event may be selected by control processor 210-1 for recording based on the user's profile. The day of the week, channel, and/or time of previously set timers may also be used to record television programming. For instance, if a user has previously set a timer to record television channel five at 8 PM on Thursdays, control processor 210-1 may set a timer for this same day of the week, channel, and time for some point in the future (even though the user has not specifically selected it).

On-demand programming 227 may represent additional television programming stored by storage medium 225. On-demand programming 227 may include television programming that was not recorded to storage medium 225 via a timer (either user- or provider-defined). Rather, on-demand programming is programming provided to the television receiver directly for storage by the television receiver and for later presentation to one or more users. On-demand programming may not be user-selected. As such, the television programming stored to on-demand programming storage 227 may be the same for each television receiver of a television service provider.

User interface 250 may include a remote control (physically separate from television receiver 200) and/or one or more buttons on television receiver 200 that allow a user to interact with television receiver 200. User interface 250 may be used to select a television channel for viewing, view information from EPG database 230, and/or program a timer stored to DVR database 245, wherein the timer is used to control the DVR functionality of control processor 210-1. In some embodiments, it may be possible to load some or all preferences to a remote control. As such, the remote control can serve as a backup storage device for the preferences.

Referring back to tuners 215, television channels received via satellite (or cable) may contain at least some scrambled data. Packets of audio and video may be scrambled to prevent unauthorized users (e.g., nonsubscribers) from receiving television programming without paying the television service provider. When a tuner of tuners 215 is receiving data from a particular transponder of a satellite, the transponder stream may be a series of data packets corresponding to multiple television channels. Each data packet may contain a packet identifier (PID), which, in combination with NIT 240 and/or PMT 257, can be determined to be associated with a particular television channel. Particular data packets, referred to as entitlement control messages (ECMs), may be periodically transmitted. ECMs may be associated with another PID and may be encrypted; television receiver 200 may use decryption engine 261 of security device 260 to decrypt ECMs. Decryption of an ECM may only be possible if the user has authorization to access the particular television channel associated with the ECM. When an ECM is determined to correspond to a television channel being stored and/or displayed, the ECM may be provided to security device 260 for decryption.

When security device 260 receives an encrypted ECM, security device 260 may decrypt the ECM to obtain some number of control words. In some embodiments, from each ECM received by security device 260, two control words are obtained. In some embodiments, when security device 260 receives an ECM, it compares the ECM to the previously received ECM. If the two ECMs match, the second ECM is not decrypted because the same control words would be obtained. In other embodiments, each ECM received by security device 260 is decrypted; however, if a second ECM matches a first ECM, the outputted control words will match; thus, effectively, the second ECM does not affect the control words output by security device 260. Security device 260 may be permanently part of television receiver 200 or may be configured to be inserted and removed from television receiver 200, such as a smart card, cable card or the like.

Tuning management processor 210-2 may be in communication with tuners 215 and control processor 210-1. Tuning management processor 210-2 may be configured to receive commands from control processor 210-1. Such commands may indicate when to start/stop receiving and/or recording of a television channel and/or when to start/stop causing a television channel to be output to a television. Tuning management processor 210-2 may control tuners 215. Tuning management processor 210-2 may provide commands to tuners 215 that instruct the tuners which satellite, transponder, and/or frequency to tune to. From tuners 215, tuning management processor 210-2 may receive transponder streams of packetized data. As previously detailed, some or all of these packets may include a PID that identifies the content of the packet.

Tuning management processor 210-2 may be configured to create one or more PID filters 255 that sort packets received from tuners 215 based on the PIDs. When a tuner is initially tuned to a particular frequency (e.g., to a particular transponder of a satellite), a PID filter may be created based on the PMT data. The PID created, based on the PMT data packets, may be known because it is stored as part of NIT 240 or another table, such as a program association table (PAT). From the PMT data packets, PMT may be constructed by tuning management processor 210-2.

PID filters 255 may be configured to filter data packets based on PIDs. In some embodiments, PID filters 255 are created and executed by tuning management processor 210-2. For each television channel to be output for presentation or recording, a separate PID filter may be configured. In other embodiments, separate hardware may be used to create and execute such PID filters. Depending on a television channel selected for recording/viewing, a PID filter may be created to filter the video and audio packets associated with the television channel (based on the PID assignments present in PMT 257). For example, if a transponder data stream includes multiple television channels, data packets corresponding to a television channel that is not desired to be stored or displayed by the user may be ignored by PID filters 255. As such, only data packets corresponding to the one or more television channels desired to be stored and/or displayed may be filtered and passed to either descrambling engine 265 or security device 260; other data packets may be ignored. For each television channel, a stream of video packets, a stream of audio packets (one or both of the audio programs) and/or a stream of ECM packets may be present, each stream identified by a PID. In some embodiments, a common ECM stream may be used for multiple television channels. Additional data packets corresponding to other information, such as updates to NIT 240, may be appropriately routed by PID filters 255. At a given time, one or multiple PID filters may be executed by tuning management processor 210-2. Similar to a PID filter being created for a particular television channel, a PID filter may be created for timing signals for use in determining the location of the television receiver.

Descrambling engine 265 may use the control words output by security device 260 in order to descramble video and/or audio corresponding to television channels for storage and/or presentation. Video and/or audio data contained in the transponder data stream received by tuners 215 may be scrambled. Video and/or audio data may be descrambled by descrambling engine 265 using a particular control word. Which control word output by security device 260 to be used for successful descrambling may be indicated by a scramble control identifier present within the data packet containing the scrambled video or audio. Descrambled video and/or audio may be output by descrambling engine 265 to storage medium 225 for storage (in DVR database 245) and/or to decoder module 233 for output to a television or other presentation equipment via television interface 235.

External storage device 252 may represent an external, detachable computer-readable non-transitory storage device. The storage device may be memory, a hard drive, or some other type of device for storing computer-readable data. The user may be permitted to connect and disconnect external storage device 252 to increase and decrease an amount of storage space available for storing on-demand programming, service provider-managed television programming, and/or user managed television programming.

For simplicity, television receiver 200 of FIG. 2 has been reduced to a block diagram; commonly known parts, such as a power supply, have been omitted. Further, some routing between the various modules of television receiver 200 has been illustrated. Such illustrations are for exemplary purposes only. The state of two modules not being directly or indirectly connected does not indicate the modules cannot communicate. Rather, connections between modules of the television receiver 200 are intended only to indicate possible common data routing. It should be understood that the modules of television receiver 200 may be combined into a fewer number of modules or divided into a greater number of modules. Further, the components of television receiver 200 may be part of another device, such as built into a television. Television receiver 200 may include one or more instances of various computerized components, such as disclosed in relation to computer system 800 of FIG. 8.

While the television receiver 200 has been illustrated as a satellite receiver, it is to be appreciated that techniques below may be implemented in other types of television receiving devices, such a cable receivers, terrestrial receivers, IPTV receivers or the like. In some embodiments, the television receiver 200 may be configured as a hybrid receiving device, capable of receiving content from disparate communication networks, such as satellite and terrestrial television broadcasts. In some embodiments, the tuners may be in the form of network interfaces capable of receiving content from designated network locations.

Figure 3:
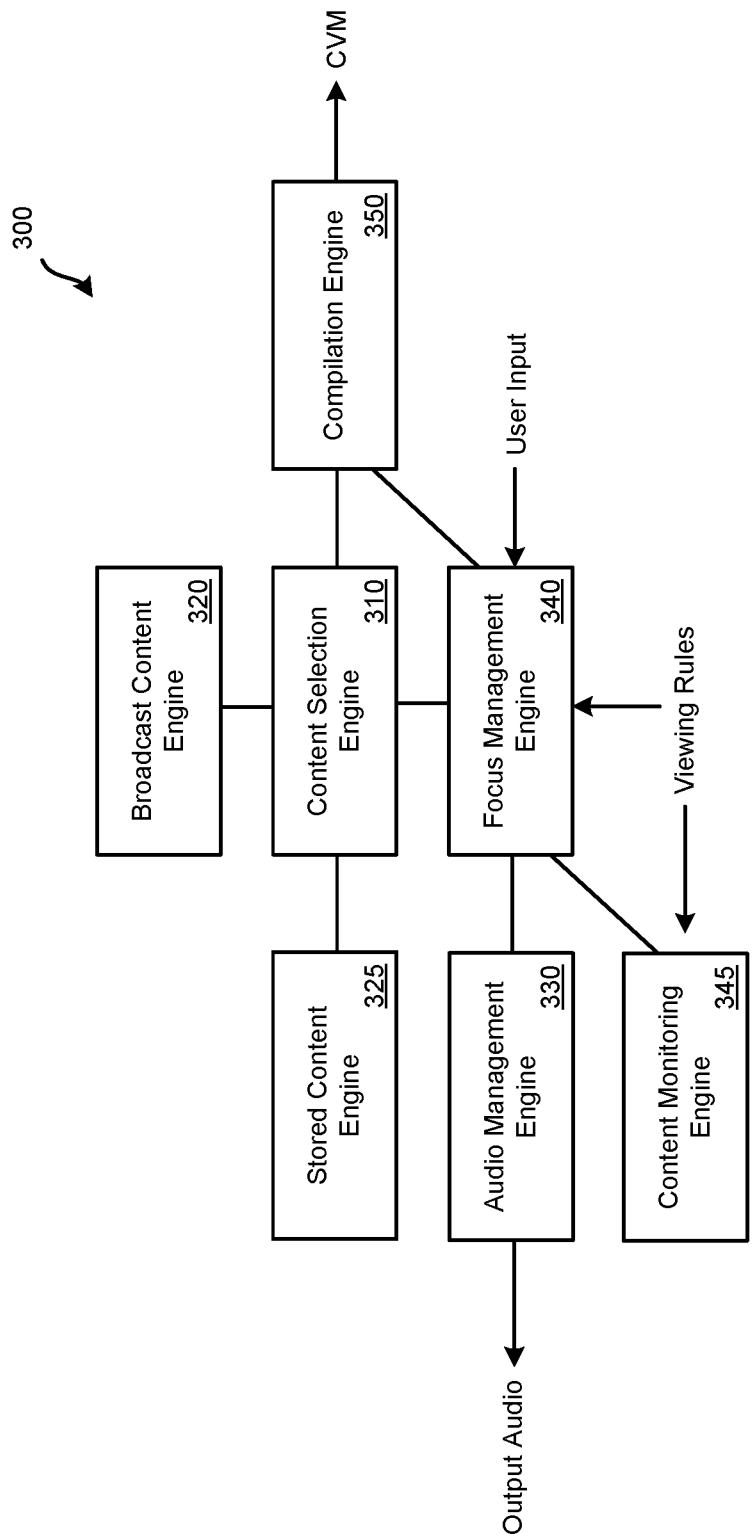
FIG. 3 illustrates an embodiment of a system configured to control focus for presentation of a customized video mosaic.

FIG. 3 illustrates an embodiment of mosaic management engine 300 for presentation of a customized video mosaic (CVM). Mosaic management engine 300 may be part of mosaic management engine 211 of television receiver 200 of FIG. 2. While mosaic management engine 211 is illustrated as a component of control processor 210-1, it should be understood that the functionality of mosaic management engine 300 may be distributed among various components of television receiver 200. Mosaic management engine 300 may include: content selection engine 310, broadcast content engine 320, stored content engine 325, audio management engine 330, focus management engine 340, content monitoring engine 345, and compilation engine 350.

Content selection engine 310 may serve to help select the content that is to be used to be presented via the CVM. Content selection engine 310 may identify content based on categories (e.g., sports, news, reality, sitcoms, drama, etc.) and allow a user to select a particular category of content for presentation in the CVM. Content selection engine 310 may assess the number of tuners of the television receiver that are available for use. Tuners may be unavailable if they are already committed to tuning to a particular transponder stream, such as for viewing of a television channel or for recording of content on the television channel. It may be possible that a tuner is being used to receive the television channel for a presentation device or other television receiver in communication with the television receiver that includes mosaic management engine 300.

Content selection engine 310 may allocate portions of the CVM between broadcast content and stored content based on the number of available tuners. For instance, if only a single tuner is available for use, the CVM may be configured by content selection engine 310 to present stored content in more tiles. If several tuners are available for use, the CVM may be configured by content selection engine 310 to present more broadcast content in more tiles. If a transponder stream is present that contains preview clips for multiple television channels, only a single tuner may be needed to present multiple tiles within the CVM for various pieces of broadcast content. Content selection engine 310 may determine the amount of broadcast content and the amount of stored content presented in the CVM based on user preference, which may be stored in a user profile. For instance, a user may specify that on-demand content is never to be presented in the CVM and no more than one piece of content recorded based on a user-defined timer is to be presented as part of the CVM.

Broadcast content engine 320 may recommend the broadcast content to be presented in a number of allocated tiles of the CVM. As such, broadcast content engine 320 may require at least one tuner to receive broadcast content being broadcast live. In some embodiments, this may include the tuner being tuned to the preview clip transponder stream, which can be used to populate one or more tiles of the CVM. Broadcast content engine 320 may select what broadcast content is presented based on factors including: what television channels are currently being watched (or are anticipated to be watched) by the most viewers in a geographic region, the user's stored profile, a category defined by the user to be desired (e.g., sports), and/or a category determined based on viewing habits to be the most popular for the user. Television programming currently being broadcast may be associated with one or more tags that ties it to a particular category. For example, basketball games, baseball games, hockey games, and football games may be tied to a sports category.

Stored content engine 325 may make recommendations from among available content stored by the television receiver for presentation in allocated tiles of the CVM. Stored content engine 325 may choose among content stored based on user-defined timers, a provider-defined timers, receiver-defined timers, and on-demand content. Stored content engine 325 may be able to access DVR database 245, and/or on-demand programming 227. Factors that may be used by stored content engine 325 to select which stored content is presented via the CVM may include: content that has recently become available (e.g., recorded since the user last accessed the television receiver), on-demand content the television service provider desires to promote, and/or stored content that the user is expected to want to watch based on stored viewing habits.

In addition to using factors such as user preferences and the number of available tuners, content selection engine 310 may assess the content selected by stored content engine 325 and broadcast content engine 320 to determine which pieces of content should be presented via the CVM and in what order. In addition to content being selected for presentation based on category and/or prediction based on the user, a user may be able to manually select content for presentation as part of the CVM via input to content selection engine 310. For instance: 1) a user may select television channels/stored content to be presented or particular instances of content, such as particular sporting events; 2) the user may select a category then modify (add, delete) content for presentation; and 3) the user may load a previously-stored content grouping for presentation in the CVM.

Figure 4A:
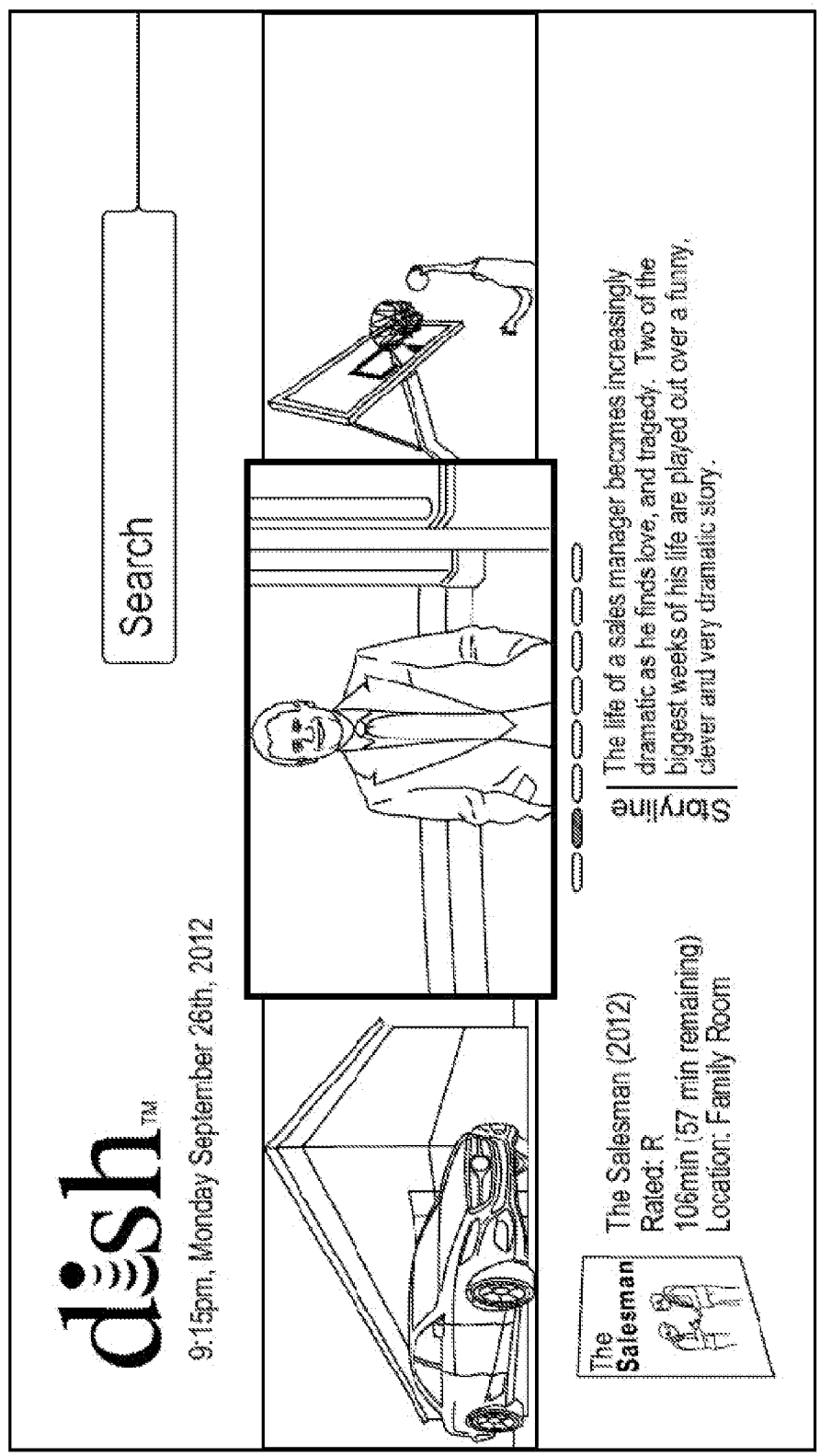
FIG. 4A illustrates an embodiment of a customized video mosaic.
Figure 4B:
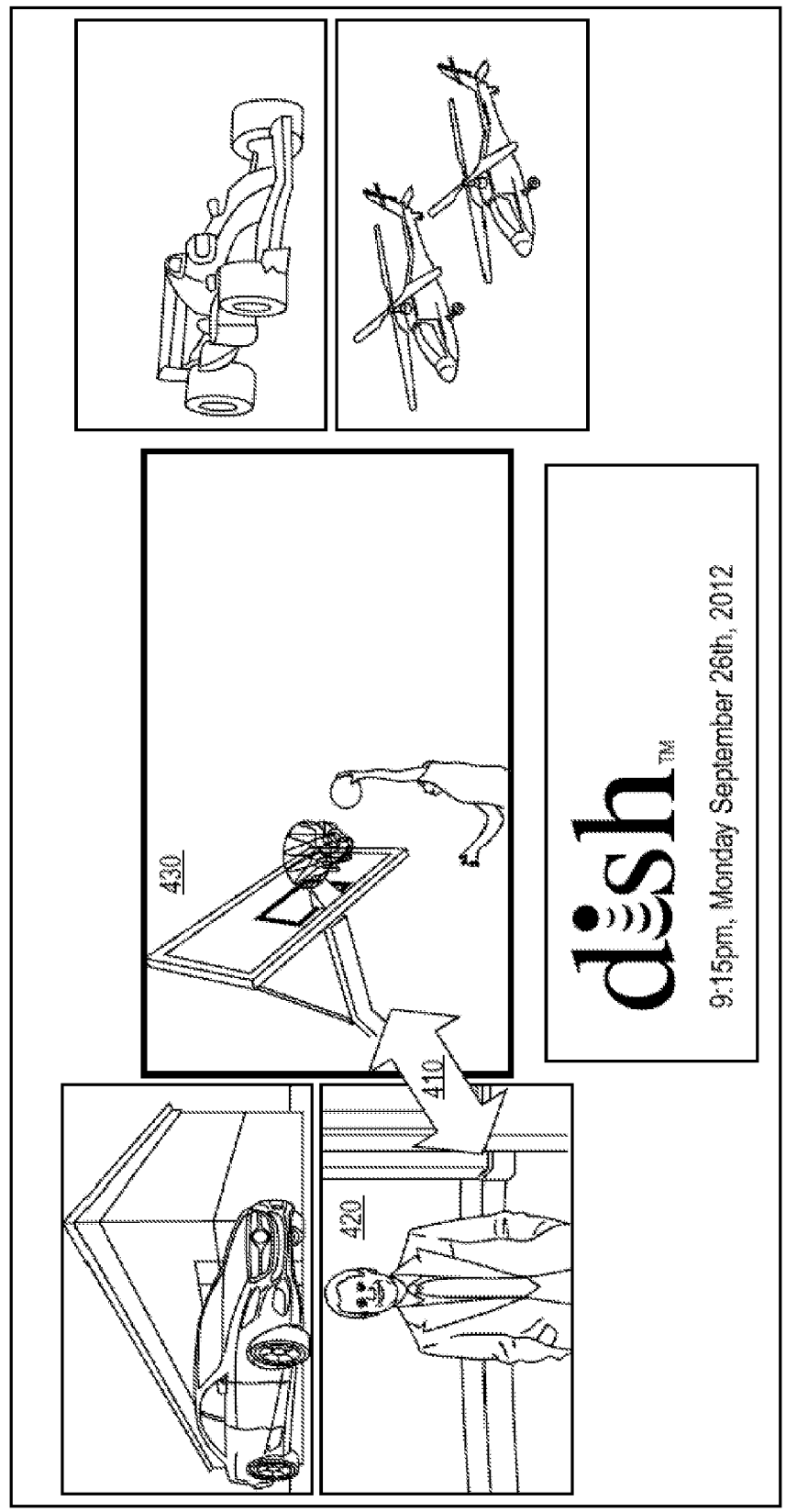
FIG. 4B illustrates another embodiment of a customized video mosaic.
Figure 5:
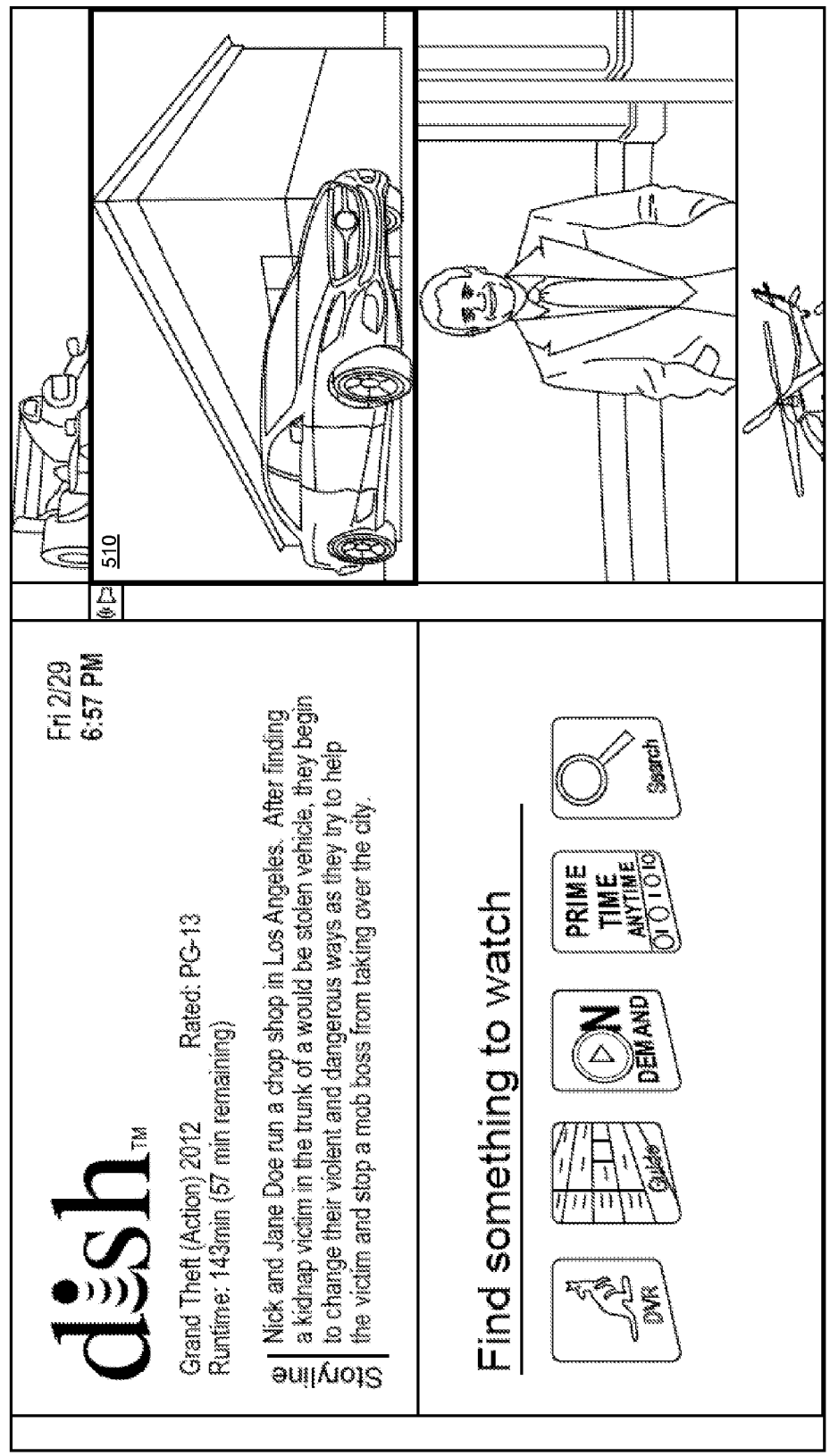
FIG. 5 illustrates another embodiment of a customized video mosaic.

Compilation engine 350 may serve to receive the pieces of content, which may include both broadcast and stored content, for presentation as tiles in the CVM. Compilation engine 350 may format the content into a graphical user interface appropriate to be output for presentation to the user in the form of the CVM. As examples, FIGS. 4 and 5 illustrate possible embodiments of CVMs as output for presentation to a user. Compilation engine 350 may determine an arrangement for how pieces of content should be presented at least partially based on a number of pieces of content to be presented. For instance, in FIG. 4A, where three pieces of content are presented, the pieces of content are presented horizontally in a row. However, in FIG. 4B, wherein five pieces of content are presented, an arrangement other than a row is used. Therefore, based on the number of pieces of content indicated to compilation engine 350 by content selection engine 310, the format used by compilation engine 350 for content presentation may vary.

Focus management engine 340 may control which piece of content being presented as part of the CVM is currently being focused on. Focus can include: audio being output for that piece of content; a graphical indicator being output for display that indicates focus; the focused piece of content being presented larger than other pieces of content. Focus management engine 340 may enforce the viewing rules stored by viewing rules database, including orderings, front-end switches, and back-end switches, as previously detailed. A user may provide input to focus management engine 340 to create and/or modify viewing rules. Further, if a user is desirable to a change in focus, the user may provide input to focus management engine 340 to override the stored viewing rules. If the user overrides the stored viewing rules via input to focus management engine 340, the focus management engine 340 may keep focus on the user's selected piece of content. In some embodiments, an indication may be output for display, such as text and/or graphics, that indicates what piece of content would be receiving focus if focus management engine 340 was controlling focus in accordance with the defined viewing rules. The user may end an override via additional user input. Focus management engine 340 may be in communication with compilation engine 350 which causes the piece of content selected by focus management engine 340 as having focus.

As an example, compilation engine 350 may output nine tiles in the form of the CVM for presentation to a user via a presentation device, such as a television. Video in all of the nine tiles may play simultaneously. For example, three tiles may correspond to stored content, while six tiles correspond to broadcast content of a category expected to be desired by the user. Compilation engine 350 (or some other component) may access EPG database 230 such that information about the content of each tile can be presented as part of the CVM. Focus management engine 340 may control which tile of the CVM receives focus (in some embodiments, not every tile is displayed at the same time).

In some embodiments, parental controls (or some other form of content-restriction control) is incorporated with mosaic management engine 300. In some embodiments, presentation of a CVM may require a password be entered or another form of authentication be performed to confirm that the user is authorized to view the CVM. In some embodiments, this may occur only if the CVM is determined to contain at least some age-inappropriate content. In some embodiments, the user may be able to configure mosaic management engine 300 such that age-inappropriate material is not presented as part of the CVM or is not presented unless a password or other form of authentication is performed. If the CVM is to be restricted due to parental controls, one or more pieces of content may be suppressed from being displayed that are determined to be inappropriate. Other pieces of content may be presented instead of the inappropriate content or the mosaic tiles associated with the inappropriate content may be labeled as inappropriate and/or obscured from view.

In some embodiments, the video and/or audio for tiles of the CVM may be obtained from a preview clip transponder stream for broadcast content. Selection of the clip for display in a format other than the CVM may result in a different transponder stream being tuned to for reception of a full resolution version of the broadcast content.

Content monitoring engine 345 may serve to monitor pieces of content to determine when switch conditions have occurred. Content monitoring engine 345 may monitor content for tags or other indications that pieces of content have either started or ended switch conditions (e.g., a commercial break). Indications of which switch conditions are active on which pieces of content may be provided to focus management engine 340 for evaluation by focus management engine 340 as to which piece of content should receive focus.

Audio management engine 330 may serve to ensure that audio is only output for the piece of content that is currently being focused. If the user has enabled an audio lock, the piece of content with which the audio lock is associated may have its audio output regardless of the piece of content under focus. If a user has indicated via the viewing rules that a piece of content is never to have its audio output (e.g., a web page), audio management engine 330 may mute audio output or output audio for a different piece of content.

FIG. 4A illustrates an embodiment 400A of a displayed CVM. This CVM may be output by a system, such as mosaic management engine 300 of FIG. 3. In this embodiment, the CVM includes three displayed tiles of video. In the illustrated CVM, a movie is receiving focus in the center of the display. As such, audio is output for only this focused piece of content. Also displayed is video associated with two other pieces of content. Focus is denoted in embodiment 400 by center placement and by the focused tile being larger than other tiles. An option to "join" a piece of content may be available. User selection of such an option may cause the CVM to cease being displayed and the selected piece of content to occupy the entire display. Such a change in presentation may result in a different stream of the piece of content being output. For example, the tile may be output from a preview clip transponder stream. If the piece of content is selected, another transponder stream is tuned to that includes a higher resolution video stream of the piece of content. In embodiment 400, scrolling may occur left-to-right and right-to-left, as tiles that are not illustrated as displayed are displayed and are focused on. Information about the piece of content, which may be obtained from the EPG database, may be displayed for the piece of content under focus. A status bar or other graphical or textual indicator, may indicate the number of pieces of content in the user's ordering. This status bar may also indicate where in the user's ordering the piece of content currently under focus is ranked.

In embodiment 400A, while three tiles are presented, the ordering created by the user may have more than three pieces of content. The rules used to determine which piece of content is to be focused on may also be used to determine which other pieces of content from the ranking are currently displayed. For instance, the viewing rules may be evaluated to determine one or more pieces of content on which focus would be given if the current piece of content under focus triggered a front-end condition. For instance, if the piece of content being focused on went to commercial, the piece of content to be focused on may be moved from adjacent on the left or right to focus. Another piece of content which was not currently presented, but is in the user's ordering, may be added to the now vacant spot in the CVM. In other embodiments, all pieces of content in the user's ordering may be presented simultaneously.

FIG. 4B illustrates another embodiment 400B of a displayed CVM. In embodiment 400B, the center piece of content may be the piece of content being focused on. Pieces from the left and right of the center piece of content may be moved into the center as focus changes. For instance, arrow 410 illustrates two pieces of content being swapped in position for when piece of content 420 is to be focused on. Piece of content 430 may be moved to the lower-left position of piece of content 420 to the position formerly occupied by piece of content 420. Embodiment 400B involves five pieces of content being displayed simultaneously. Which illustrated embodiment is used for presentation of pieces of content may be at least partially dependent on the number of pieces of content to be presented.

FIG. 5 illustrates another embodiment 500 of a displayed CVM. In this embodiment, scrolling may occur up and down as pieces of content in the form of tiles are displayed and focused on. In the illustrated embodiment, the piece of content 510 is focused on, which is indicated by a speaker icon (indicating an active audio output) and an enlarged border. Information about the piece of content, which may be obtained from the EPG database, may be displayed for the piece of content under focus. In embodiment 500, two tiles are partially presented. These tiles which are only partially presented may also be played back simultaneously with tiles that are fully presented. As focus shifts, these partially-displayed tiles may be scrolled on and off screen. If a user activated an audio lock for another piece of content, the speaker icon (or some other graphical identifier) may be presented in association with a tile for that piece of content, while an indication of focus is on the focused piece of content.

The pieces of content under focus and displayed, but not under focus in FIGS. 4A, 4B, and 5 may be played simultaneously. The pieces of content can include broadcast content, on-demand content, recorded content, and/or web-based content. The illustrated embodiments are intended as examples, greater or fewer numbers of tiles may be present in a CVM.

Figure 6:
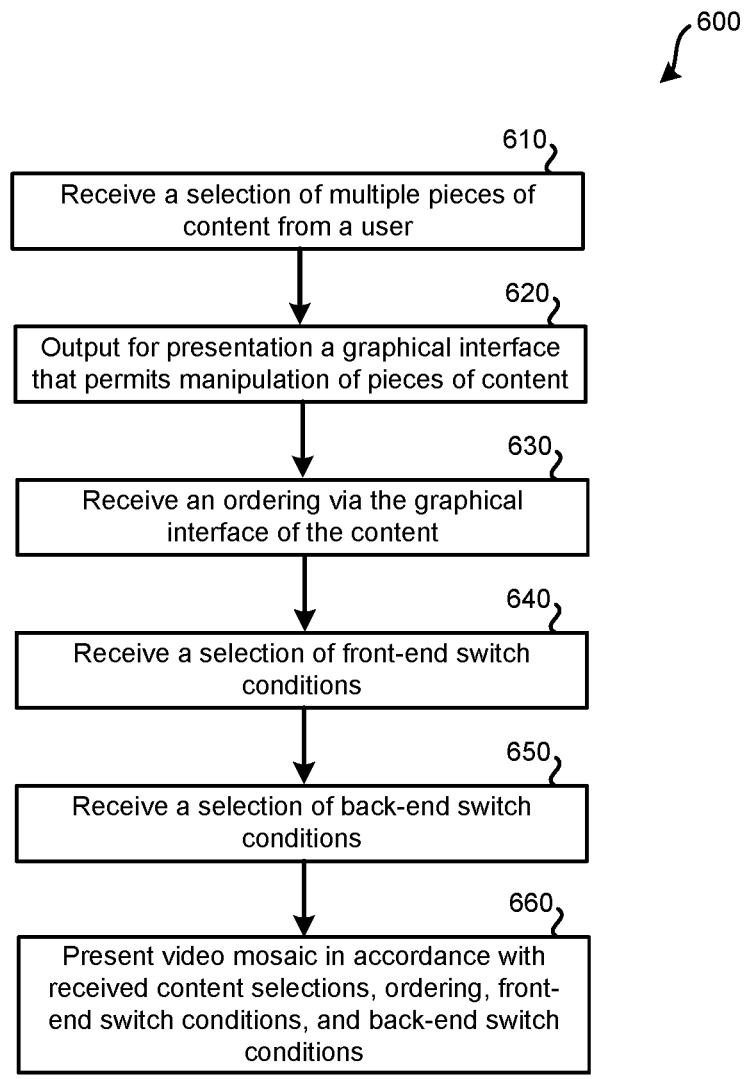
FIG. 6 illustrates an embodiment of a method for configuring a customized video mosaic.

FIG. 6 illustrates an embodiment of a method 600 for configuring a customized video mosaic (CVM). Method 600 may be performed using the systems previously described. For instance, satellite television distribution system 100, television receiver 200, and/or mosaic management engine 300 of FIGS. 1-3, respectively, may be used to perform method 600. Components of such systems may be implemented using hardware, software, and/or firmware. Further, the performance of method 700 may include one or more instances of the components of computer system 800 of FIG. 8. As such, means for performing each step of method 600 can include one or more instances of the following: one or more components of satellite television distribution system 100, one or more components of television receiver 200, one or more components of mosaic management engine 300, and/or one or more components of computer system 800 of FIG. 8.

At step 610, via a graphical interface output by a television receiver, the user may select multiple pieces of content that the user desires to have presented in a CVM. Step 610 may involve a user selecting a category of content from a listing of predefined categories, such as sports, sitcoms, drama, news, etc. Based upon the category selected by the user, various pieces of content, which may include broadcast content, recorded content, on-demand content, and web-based content may be identified by the television receiver for inclusion in the CVM. Pieces of content may be associated with metadata that identifies a particular category with which the piece of content is associated. Such metadata may be retrieved by the television receiver from a locally-stored EPG database. Following the selection of a category, the user may be permitted to add and/or delete various pieces of content from inclusion in the CVM. Alternatively, rather than selecting a category, the user may be permitted to identify individual pieces of content that the user desires included in the CVM. This may involve the user being able to access an EPG display to select various pieces of content, which may include: on-demand content, broadcast content, recorded content, and/or web-based content. Additionally, or alternatively, selections of content may have been saved by the user from loading. For example, the user may select five sporting events for display, with a ranking of particular interest in the games. At step 610, the user may select that this previous selection of content be loaded. For example, each Sunday, the user may desire that the same television channels be added to the CVM for sports viewing.

At step 620, a graphical interface may be output for presentation by the television receiver that permits manipulation of the various pieces of content by the user. For step 620, the various pieces of content may be presented for selection as text and/or graphics. In some embodiments, the pieces of content may be presented in the graphical interface as video feeds being output for presentation simultaneously. At step 630, via the graphical interface that is being presented at step 620, the user may define an ordering that is received by the television receiver. The ordering may indicate an order of preference for the pieces of content selected at step 610. The user may be permitted to organize the piece of content by dragging and dropping them into an order that indicates the user's preference, from most preferred to least preferred. In some embodiments, the user may order the pieces of content by highlighting an indication of the piece of content and assigning a priority using a remote control in communication with the television receiver.

At step 640, the user may provide an indication of one or more front-end switch conditions which may be received by the television receiver. The front-end switch conditions, such as those previously described, may be selected by the user from a listing of various options of front-end switch conditions. Selection of front-end switch conditions at step 640 may include the user selecting a predefined set up of front-end switch conditions. For example, the user may have previously configured front-end switch conditions that the user prefers; step 640 may involve the user selecting that these previously defined switch conditions be loaded. As a default, the most recently defined front-end switch conditions received from the user may be selected.

At step 650, the user may provide an indication of one or more back-end switch conditions, which may be received by the television receiver. The back-end switch conditions, such as those previously described, may be selected by the user from a listing of various options of back-end switch conditions. Selection of back-end switch conditions at step 650 may include the user selecting a predefined set up of back-end switch conditions. For example, the user may have previously configured back-end switch conditions that the user prefers; step 650 may involve the user selecting that these previously defined switch conditions be loaded. Loading of such back-end switch conditions may be performed in concert with the loading of the previously-defined front-end switch conditions of step 640. As a default, the most recently defined back-end switch conditions received from the user may be selected.

At step 660, the CVM may be output for presentation in accordance with the received content selections, ordering, front end switch conditions, and back-end switch conditions. Therefore, once step 660 has begun, a user may watch the CVM without providing input and allowing the television receiver to automatically change focus of the CVM between various pieces of content in accordance with the input provided by the user at steps 610, 630, 640 and 650. The television receiver may perform step 660 in accordance with method 700 of FIG. 7.

Figure 7:
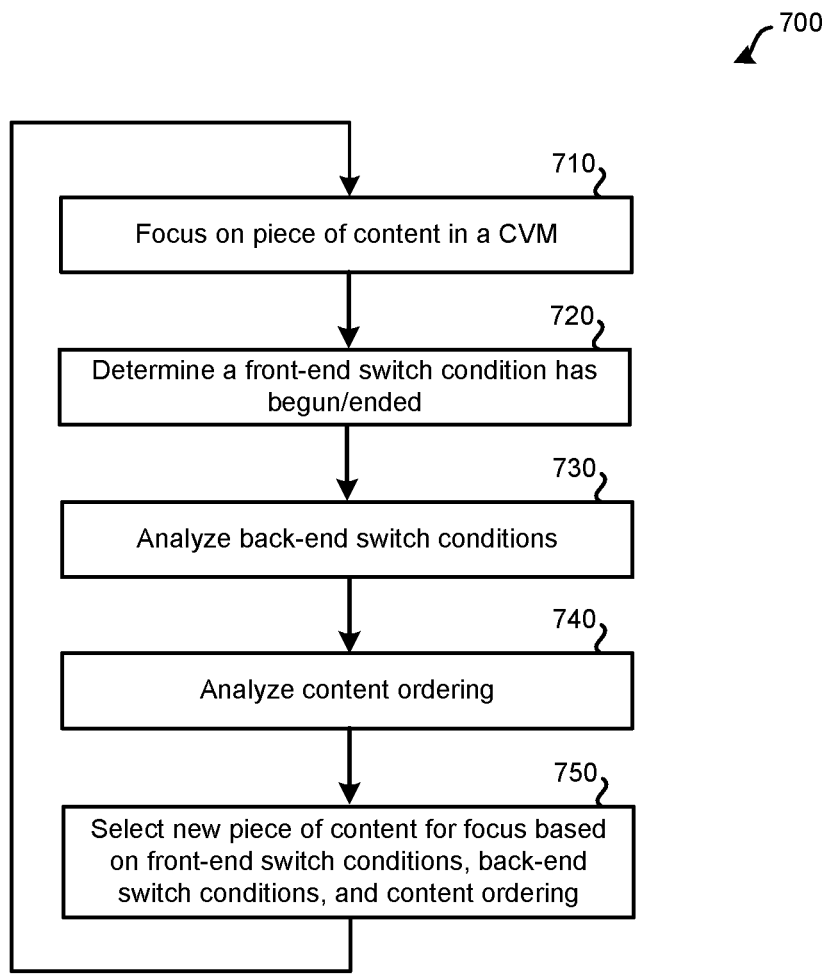
FIG. 7 illustrates an embodiment of a method for controlling a customized video mosaic.

FIG. 7 illustrates an embodiment of a method 700 for controlling a customized video mosaic (CVM). Method 700 may be performed using the systems previously described. For instance, satellite television distribution system 100, television receiver 200, and/or mosaic management engine 300 of FIGS. 1-3, respectively, may be used to perform method 600. Components of such systems may be implemented using hardware, software, and/or firmware. In some embodiments, all steps are performed by a television receiver. Further, the performance of method 700 may include one or more instances of the components of computer system 800 of FIG. 8. As such, means for performing each step of method 700 can include one or more instances of the following: one or more components of satellite television distribution system 100, one or more components of television receiver 200, one or more components of mosaic management engine 300, and/or one or more components of computer system 800 of FIG. 8. Method 700 may be performed as part of step 660 of method 600 of FIG. 6.

At step 710, a piece of content may be focused on in the CVM by the television receiver. Focus may include: audio for the piece of content being output, a tile for the piece of content being presented in the CVM larger than tiles associated with other pieces of content, and/or a graphical indicator of focus (such as a bolded border of the tile). The piece of content on which focus is directed at step 710 may be based on the ordering received from the user. By default, the most preferred piece of content indicated in the ordering may initially receive focus at step 710.

At step 720, it may be determined that a front-end switch condition has begun. The beginning of a front-end switch condition may be indicated by one or more metadata tags associated with a piece of content being received and processed by the television receiver. For example, when a commercial break begins, a metadata tag may indicate as such. In some embodiments, the television receiver may be configured to identify certain front-end switch conditions without metadata information. For example, television receiver may be configured to determine, based on video, when a commercial break has begun using various audio and/or video detection techniques. Step 720, in addition to determining the start of a front-end switch condition has occurred, the end of the front-end switch condition may also be determined. For example, the end of a commercial break may be determined. Both the beginning and the end of a front-end switch condition may trigger the focus of the CVM to be reevaluated and/or switched.

At step 730, after a front end switch condition has been determined to have begun or ended, back-end switch conditions, such as those listed in Table 1, may be analyzed. Back-end switch conditions may determine whether a switch in focus immediately occurs, or occurs at some later time. Back-end switch conditions may also define how recorded content, on-demand content, web content, and the ordering is handled going forward. Therefore, depending on the back-end switch conditions selected by the user, a front end switch condition ending on a higher ranked piece of content according to the ordering may not necessarily result in the higher ranked piece of content receiving focus or, more generally, a change in focus.

Following the analysis of step 730 of the back-end conditions, if it is determined that focus is to be switched in accordance with the user's defined back-end switch conditions, the content ordering which was previously defined by the user, may be evaluated at step 740. How the content ordering is employed may vary based on the user's selected back-end switch conditions. For instance, the user may have specified that focus is to be returned to the highest ranked piece of content, which would involve determining which piece of content in ordering has the highest rank. Alternatively, the user may specify that focus is to be moved to the next lower piece of content according to the ordering, which would involve determining the rank of the current piece of content in the ordering and determining the next ranked piece of content.

In response to the occurrence of the front-end condition at step 720, the analysis of the back-end conditions of step 730, and the analysis of the content ordering at step 740, a different piece of content may be selected for focus at step 750. This may involve scrolling or otherwise rearranging one or more tiles of the CVM as output for display by a presentation device. It may also involve one or more tiles no longer being fully or even partially displayed. Whichever tile containing the piece of content to receive focus may be fully displayed. The output audio may be switched from the previous piece of content to the audio stream of the now-focused piece of content. A cross fade may be used such that the switch and audio does not sound overly abrupt. Once focus is given to a particular piece of content and a tile, a minimum period of time, which may have been set as a backend switch condition, may be required to elapse before another change in focus is permitted.

At various points in method 700, a user may override the process of the television receiver determining the tile of the CVM that receives focus. A user may select a particular tile and indicate that a focus lock is to remain on such tile until the user removes the focus lock. Enforcement of the viewing rules, including the front-end and back-end switch conditions may be abrogated until the user removes the focus lock. During the focus lock, a graphical and/or textual indication may be displayed that indicates which tile would receive focus if the focus lock was not in place.

Also at various points in method 700, a user may specify an audio lock. An audio lock may cause the audio associated with a particular tile to be output regardless of how the focus changes. Therefore, a user may listen to the audio of a particular piece of content, while allowing video focus to switch between various pieces of content. Enforcement of the viewing rules related to audio, including audio-related front-end and audio-related back-end switch conditions, may be abrogated until the user removes the audio lock. During the audio lock, a graphical and/or textual indication may be displayed that indicates which tile would have its audio played if the audio lock was not in place. Enforcement of such an audio lock for broadcast content may include maintaining a tuner tuned to the transponder stream that includes the piece of content and maintaining a PID filter for the desired audio. As an example, an audio lock may work well for sports, where a user may want to view a video stream from a particular car, but be listening to audio from another television channel, such as broadcasters discussing the race as a whole.

Figure 8:
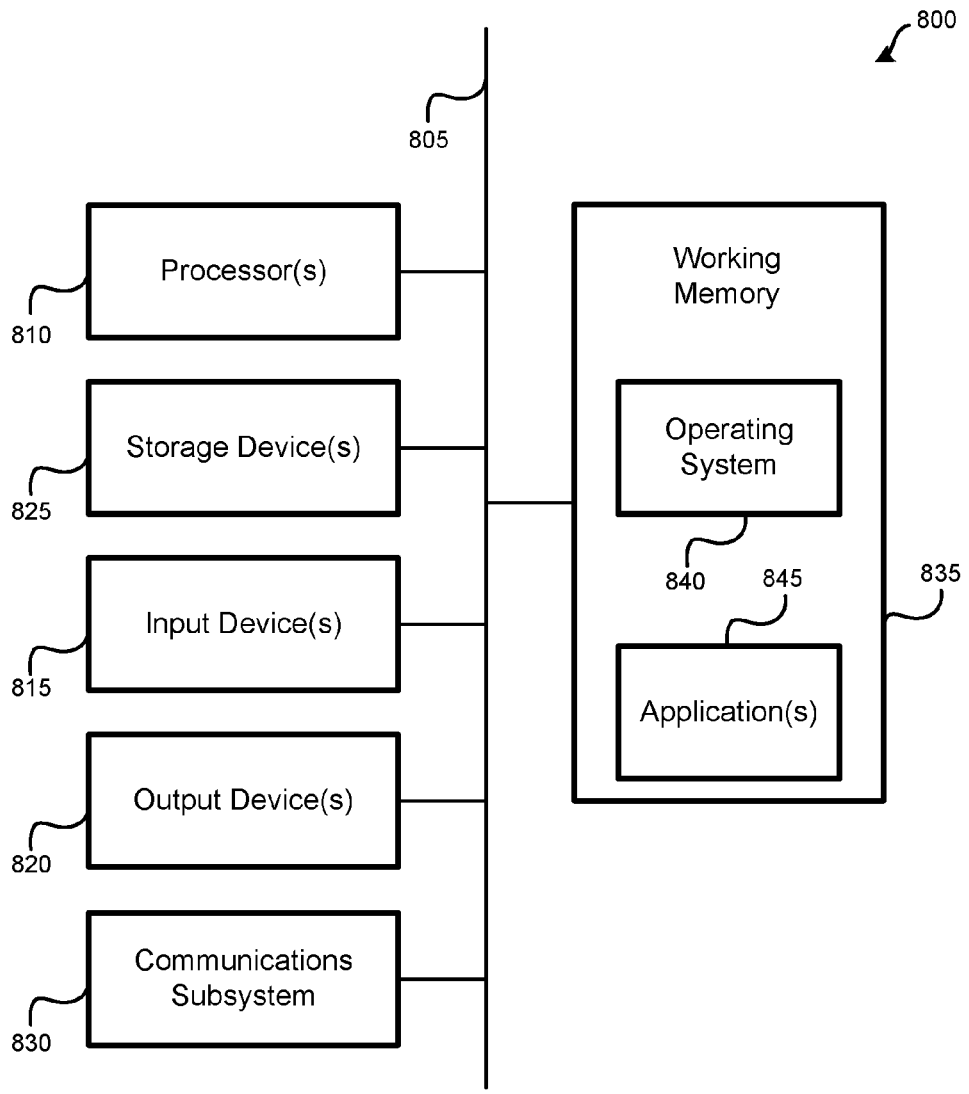
FIG. 8 illustrates an embodiment of a computer system.

A computer system as illustrated in FIG. 8 may be incorporated as part of the previously described computerized devices, such as the television receivers. FIG. 8 provides a schematic illustration of one embodiment of a computer system 800 that can perform various steps of the methods provided by various embodiments. It should be noted that FIG. 8 is meant only to provide a generalized illustration of various components, any or all of which may be utilized as appropriate. FIG. 8, therefore, broadly illustrates how individual system elements may be implemented in a relatively separated or relatively more integrated manner.

The computer system 800 is shown comprising hardware elements that can be electrically coupled via a bus 805 (or may otherwise be in communication, as appropriate). The hardware elements may include one or more processors 810, including, without limitation, one or more general-purpose processors and/or one or more special-purpose processors (such as digital signal processing chips, graphics acceleration processors, video decoders, and/or the like); one or more input devices 815, which can include, without limitation, a mouse, a keyboard, remote control, and/or the like; and one or more output devices 820, which can include, without limitation, a display device, a printer, and/or the like.

The computer system 800 may further include (and/or be in communication with) one or more non-transitory storage devices 825, which can comprise, without limitation, local and/or network accessible storage, and/or can include, without limitation, a disk drive, a drive array, an optical storage device, a solid-state storage device, such as a random access memory ("RAM"), and/or a read-only memory ("ROM"), which can be programmable, flash-updateable and/or the like. Such storage devices may be configured to implement any appropriate data stores, including, without limitation, various file systems, database structures, and/or the like.

The computer system 800 might also include a communications subsystem 830, which can include, without limitation, a modem, a network card (wireless or wired), an infrared communication device, a wireless communication device, and/or a chipset (such as a Bluetooth™ device, an 802.11 device, a WiFi device, a WiMax device, cellular communication device, etc.), and/or the like. The communications subsystem 830 may permit data to be exchanged with a network (such as the network described below, to name one example), other computer systems, and/or any other devices described herein. In many embodiments, the computer system 800 will further comprise a working memory 835, which can include a RAM or ROM device, as described above.

The computer system 800 also can comprise software elements, shown as currently being located within the working memory 835, including an operating system 840, device drivers, executable libraries, and/or other code, such as one or more application programs 845, which may comprise computer programs provided by various embodiments, and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or codes might be stored on a non-transitory computer-readable storage medium, such as the non-transitory storage device(s) 825 described above. In some cases, the storage medium might be incorporated within a computer system, such as computer system 800. In other embodiments, the storage medium might be separate from a computer system (e.g., a removable medium, such as a compact disc), and/or provided in an installation package, such that the storage medium can be used to program, configure, and/or adapt a general purpose computer with the instructions/code stored thereon. These instructions might take the form of executable code, which is executable by the computer system 800 and/or might take the form of source and/or installable code, which, upon compilation and/or installation on the computer system 800 (e.g., using any of a variety of generally available compilers, installation programs, compression/decompression utilities, etc.), then takes the form of executable code.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices, such as network input/output devices, may be employed.

As mentioned above, in one aspect, some embodiments may employ a computer system (such as the computer system 800) to perform methods in accordance with various embodiments of the invention. According to a set of embodiments, some or all of the procedures of such methods are performed by the computer system 800 in response to processor 810 executing one or more sequences of one or more instructions (which might be incorporated into the operating system 840 and/or other code, such as an application program 845) contained in the working memory 835. Such instructions may be read into the working memory 835 from another computer-readable medium, such as one or more of the non-transitory storage device(s) 825. Merely by way of example, execution of the sequences of instructions contained in the working memory 835 might cause the processor(s) 810 to perform one or more procedures of the methods described herein.

The terms "machine-readable medium," "computer-readable storage medium" and "computer-readable medium," as used herein, refer to any medium that participates in providing data that causes a machine to operate in a specific fashion. These mediums may be non-transitory. In an embodiment implemented using the computer system 800, various computer-readable media might be involved in providing instructions/code to processor(s) 810 for execution and/or might be used to store and/or carry such instructions/code. In many implementations, a computer-readable medium is a physical and/or tangible storage medium. Such a medium may take the form of a non-volatile media or volatile media. Non-volatile media include, for example, optical and/or magnetic disks, such as the non-transitory storage device(s) 825. Volatile media include, without limitation, dynamic memory, such as the working memory 835.

Common forms of physical and/or tangible computer-readable media include, for example, a floppy disk, a flexible disk, hard disk, magnetic tape, or any other magnetic medium, a CD-ROM, any other optical medium, any other physical medium with patterns of marks, a RAM, a PROM, EPROM, a FLASH-EPROM, any other memory chip or cartridge, or any other medium from which a computer can read instructions and/or code.

Various forms of computer-readable media may be involved in carrying one or more sequences of one or more instructions to the processor(s) 810 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 800.

The communications subsystem 830 (and/or components thereof) generally will receive signals, and the bus 805 then might carry the signals (and/or the data, instructions, etc., carried by the signals) to the working memory 835, from which the processor(s) 810 retrieves and executes the instructions. The instructions received by the working memory 835 may optionally be stored on a non-transitory storage device 825 either before or after execution by the processor(s) 810.

It should further be understood that the components of computer system 800 can be distributed across a network. For example, some processing may be performed in one location using a first processor while other processing may be performed by another processor remote from the first processor. Other components of computer system 800 may be similarly distributed. As such, computer system 800 may be interpreted as a distributed computing system that performs processing in multiple locations. In some instances, computer system 800 may be interpreted as a single computing device, such as a distinct laptop, desktop computer, or the like, depending on the context.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered.

What is claimed is:

1. A television receiver comprising:
one or more processors; and
a memory communicatively coupled with, and readable by, the one or more processors and having stored therein processor-readable instructions which, when executed by the one or more processors, cause the one or more processors to:
receive, from a user of the television receiver, a ranking of a plurality of pieces of content, a front-end switching condition, and a back-end switching condition, wherein:
the front-end switching condition defines criteria occurring within a piece of content that triggers when focus is to switch to another piece of content; and
the back-end switching condition defines when focus is to switch to a higher-ranked piece of content following the front-end switching condition ending;
cause the television receiver to output, to a presentation device, a customized video mosaic comprising a plurality of pieces of content presented as a plurality of tiles, wherein:
each piece of content of the plurality of pieces of content is individually presented as one tile of the plurality of tiles, and
each piece of content is linked with a corresponding audio stream;
control focus among the plurality of tiles within the customized video mosaic based on the ranking, the front-end switching condition, and the back-end switching condition, wherein a tile from the plurality of tiles receives focus at a given time.

2. The television receiver of claim 1, wherein the processor-readable instructions, when executed, further cause the one or more processors to cause the television receiver to output for presentation the tile larger than other tiles of the plurality of tiles.

3. The television receiver of claim 1, wherein the processor-readable instructions, when executed, further cause the one or more processors to cause the television receiver to output only the corresponding audio stream linked with the piece of content presented within the tile currently selected for focus.

4. The television receiver of claim 1, wherein the back-end switching condition requires the front-end switching condition to end on a highest-ranked piece of content presented in the tile of the plurality of pieces of content in order for focus to switch based on the back-end switching condition.

5. The television receiver of claim 1, wherein the back-end switching condition requires the front-end switching condition to end on any piece of content of the plurality of pieces of content that is higher ranked than the piece of content that currently has focus in order for focus to change based on the back-end switching condition.

6. The television receiver of claim 1, wherein the back-end switching condition specifies a minimum amount of time on which focus must be maintained on the tile before focus is changed to another tile presenting a higher ranked piece of content of the plurality of pieces of content.

7. The television receiver of claim 1, wherein the processor-readable instructions, when executed, further cause the one or more processors to:
receive an audio lock command that selects an audio stream from a plurality of audio streams based on the tile currently receiving focus; and
in response to the audio lock command, output the selected audio stream regardless of focus.

8. The television receiver of claim 1, wherein the processor-readable instructions, when executed, further cause the one or more processors to pause any piece of content of the plurality of pieces of content that are stored locally by the television receiver and not presented in the tile currently receiving focus.

9. The television receiver of claim 1, wherein the criteria of the front-end switching condition is a presence of a commercial break.

10. A method for controlling presentation of multiple pieces of content, the method comprising:
storing, by a television receiver, a ranking of a plurality of pieces of content, a front-end switching condition, and a back-end switching condition, wherein:
the front-end switching condition defines criteria occurring within a piece of content that triggers when focus is to switch to another piece of content; and
the back-end switching condition defines when focus is to switch to a higher-ranked piece of content following the front-end switching condition ending;
outputting, by the television receiver, to a presentation device, a customized video mosaic comprising a plurality of pieces of content presented as a plurality of tiles, wherein:
each piece of content of the plurality of pieces of content is individually presented as one tile of the plurality of tiles, and
each piece of content is linked with a corresponding audio stream;
controlling, by the television receiver, focus among the plurality of tiles within the customized video mosaic based on the ranking, the front-end switching condition, and the back-end switching condition, wherein a tile from the plurality of tiles receives focus at a given time.

11. The method for controlling presentation of multiple pieces of content of claim 10, further comprising outputting, by the television receiver, the tile for presentation larger than other tiles of the plurality of tiles based on the tile receiving focus.

12. The method for controlling presentation of multiple pieces of content of claim 10, further comprising outputting, by the television receiver, only the corresponding audio stream linked with the piece of content presented within the tile currently selected for focus.

13. The method for controlling presentation of multiple pieces of content of claim 10, wherein the back-end switching condition requires the front-end switching condition to end on a highest-ranked piece of content presented in the tile of the plurality of pieces of content in order for focus to switch based on the back-end switching condition.

14. The method for controlling presentation of multiple pieces of content of claim 10, wherein the back-end switching condition requires the front-end switching condition to end on any piece of content of the plurality of pieces of content that is higher ranked than the piece of content that currently has focus in order for focus to change based on the back-end switching condition.

15. The method for controlling presentation of multiple pieces of content of claim 10, wherein the back-end switching condition specifies a minimum amount of time on which focus must be maintained on the tile before focus is changed to another tile presenting a higher ranked piece of content of the plurality of pieces of content.

16. The method for controlling presentation of multiple pieces of content of claim 10, further comprising:
   receiving, by the television receiver, an audio lock command that selects an audio stream from a plurality of audio streams based on the tile currently receiving focus; and
   outputting, by the television receiver, the selected audio stream regardless of focus in response to the audio lock command.

17. The method for controlling presentation of multiple pieces of content of claim 10, further comprising pausing any piece of content of the plurality of pieces of content that are stored locally by the television receiver and not presented in the tile currently receiving focus.

18. The method for controlling presentation of multiple pieces of content of claim 10, wherein the criteria of the front-end switching condition is a presence of a commercial break.

19. A non-transitory processor-readable medium comprising processor-readable instructions that cause one or more processors of a television receiver to:
   store a ranking of a plurality of pieces of content, a front-end switching condition, and a back-end switching condition, wherein:
      the front-end switching condition defines criteria occurring within a piece of content that triggers when focus is to switch to another piece of content; and
      the back-end switching condition defines when focus is to switch to a higher-ranked piece of content following the front-end switching condition ending;
   cause the television receiver to output to a presentation device, a customized video mosaic comprising a plurality of pieces of content presented as a plurality of tiles, wherein:
      each piece of content of the plurality of pieces of content is individually presented as one tile of the plurality of tiles, and
      each piece of content is linked with a corresponding audio stream;
   control focus among the plurality of tiles within the customized video mosaic based on the ranking, the front-end switching condition, and the back-end switching condition, wherein a tile from the plurality of tiles receives focus at a given time.

20. The non-transitory processor-readable medium of claim 19, wherein the processor-readable instructions further cause the one or more processors to cause the television receiver to output only the corresponding audio stream linked with the piece of content presented within the tile currently selected for focus.

* * * * *